US012172477B2

(12) United States Patent
Salter et al.

(10) Patent No.: US 12,172,477 B2
(45) Date of Patent: Dec. 24, 2024

(54) METHODS AND APPARATUS FOR TRAILERS WITH ADJUSTABLE BATTERIES

(71) Applicant: Ford Global Technologies, LLC, Dearborn, MI (US)

(72) Inventors: Stuart C. Salter, White Lake, MI (US); Lorne Forsythe, Novi, MI (US); Hussein Berry, Dearborn, MI (US); Andrew Niedert, Farmington Hills, MI (US); Darrel Alan Recker, Ypsilanti, MI (US); Aaron Bradley Johnson, Allen Park, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 421 days.

(21) Appl. No.: 17/569,186

(22) Filed: Jan. 5, 2022

(65) Prior Publication Data
US 2023/0211641 A1    Jul. 6, 2023

(51) Int. Cl.
*B60D 1/24*      (2006.01)
*B60R 16/04*     (2006.01)
*B62D 63/08*     (2006.01)
*B60D 1/62*      (2006.01)

(52) U.S. Cl.
CPC ............. *B60D 1/247* (2013.01); *B60R 16/04* (2013.01); *B62D 63/08* (2013.01); *B60D 1/62* (2013.01)

(58) Field of Classification Search
CPC ...................................................... B60D 1/247
See application file for complete search history.

(56) References Cited

U.S. PATENT DOCUMENTS

| 2010/0065344 | A1  | 3/2010  | Collings, III |
|---|---|---|---|
| 2020/0317212 | A1  | 10/2020 | Rogness et al. |
| 2022/0089235 | A1* | 3/2022  | Kasten .................. B62D 59/04 |

FOREIGN PATENT DOCUMENTS

| DE | 102009053139 | 5/2011 |
|---|---|---|
| DE | 102019219461 | 6/2021 |
| WO | 2020039101 | 2/2020 |

* cited by examiner

*Primary Examiner* — Kevin Hurley
(74) *Attorney, Agent, or Firm* — Lorne Forsythe; Hanley, Flight & Zimmerman, LLC

(57) ABSTRACT

Methods, apparatus, systems, and articles of manufacture for trailers with adjustable batteries are disclosed herein. An example trailer disclosed herein includes a platform, a battery disposed at a first location relative to the platform, a drive to move the battery relative to the platform, and a controller to determine a first load distribution on the platform and in response to determining the first load distribution on the platform does not satisfy a first threshold, adjust a position of the battery, via the drive, to a second location relative to the platform.

20 Claims, 11 Drawing Sheets

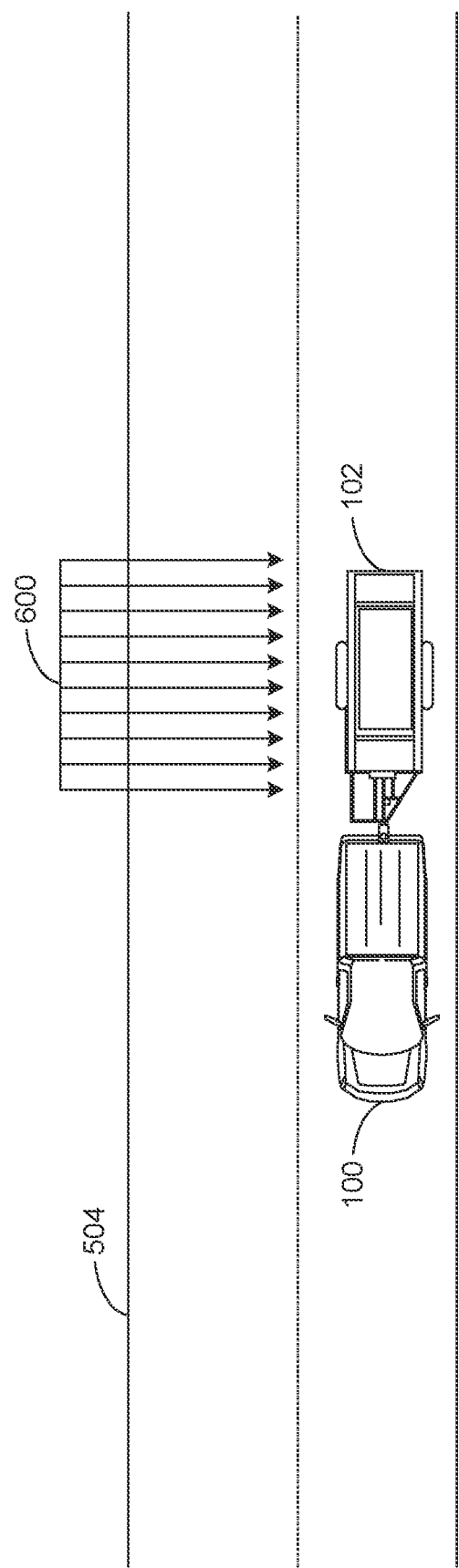

METHODS AND APPARATUS FOR TRAILERS WITH ADJUSTABLE BATTERIES

FIELD OF THE DISCLOSURE

This disclosure relates generally to vehicle systems and, more particularly, to methods and apparatus for trailers with adjustable batteries.

BACKGROUND

Electric vehicles include an electric motor that is powered by rechargeable batteries. These batteries are typically located in a battery array that is coupled to the frame of the vehicle. Batteries arrays often are large in size and contribute a significant amount of weight to the vehicle. In recent years, towed trailers can optionally include battery arrays that can be used to power the electric motors associated with the towed trailer and/or the towing vehicle.

SUMMARY

An example trailer disclosed herein includes a battery disposed at a first location relative to the platform, a drive to move the battery relative to the platform, and a controller to determine a first load distribution on the platform, and in response to determining the first load distribution on the platform does not satisfy a first threshold, adjust a position of the battery, via the drive, to a second location relative to the platform.

An example non-transitory computer readable medium disclosed herein includes instructions, which when executed, cause a processor to determine a first load distribution on a platform of a trailer coupled to a first vehicle, and in response to determining the first load distribution does not satisfy a first threshold, move, via a drive, a battery coupled to the platform from a first location to a second location.

An example method disclosed herein determining a first load distribution on a platform of a trailer coupled to a first vehicle, and in response to determining the first load distribution does not satisfy a first threshold, moving, via a drive, a battery coupled to the platform from a first location to a second location.

BRIEF DESCRIPTION OF THE DRAWINGS

FIG. 6 illustrates an example second event and associated functions of the trailer controller of FIGS. 1 and 3.

In general, the same reference numbers will be used throughout the drawing(s) and accompanying written description to refer to the same or like parts. The figures are not to scale.

DETAILED DESCRIPTION

Figure 1:
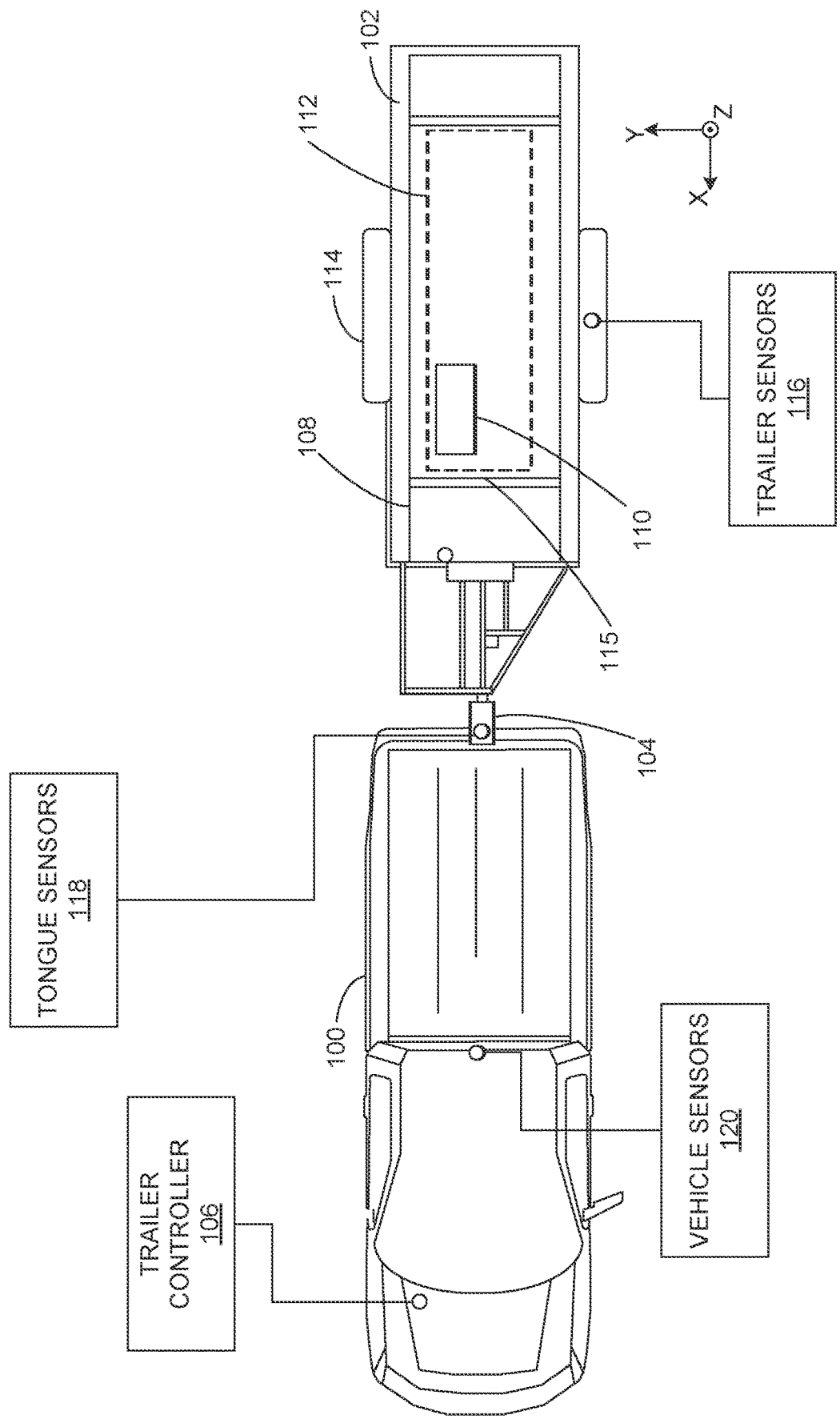
FIG. 1 is a top view of a vehicle with an attached trailer in which the teachings of this disclosure can be implemented.

As used in this patent, stating that any part (e.g., a layer, film, area, region, or plate) is in any way on (e.g., positioned on, located on, disposed on, or formed on, etc.) another part, indicates that the referenced part is either in contact with the other part, or that the referenced part is above the other part with one or more intermediate part(s) located therebetween.

As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

As used herein, "approximately" and "about" refer to dimensions that may not be exact due to manufacturing tolerances and/or other real world imperfections. As used herein "substantially real time" refers to occurrence in a near instantaneous manner recognizing there may be real world delays for computing time, transmission, etc. Thus, unless otherwise specified, "substantially real time" refers to real time+/−1 second.

As used herein, "processor circuitry" is defined to include (i) one or more special purpose electrical circuits structured to perform specific operation(s) and including one or more semiconductor-based logic devices (e.g., electrical hardware implemented by one or more transistors), and/or (ii) one or more general purpose semiconductor-based electrical circuits programmed with instructions to perform specific operations and including one or more semiconductor-based logic devices (e.g., electrical hardware implemented by one or more transistors). Examples of processor circuitry include programmed microprocessors, Field Programmable Gate Arrays (FPGAs) that may instantiate instructions, Central Processor Units (CPUs), Graphics Processor Units (GPUs), Digital Signal Processors (DSPs), XPUs, or microcontrollers and integrated circuits such as Application Specific Integrated Circuits (ASICs). For example, an XPU may be implemented by a heterogeneous computing system including multiple types of processor circuitry (e.g., one or more FPGAs, one or more CPUs, one or more GPUs, one or more DSPs, etc., and/or a combination thereof) and application programming interface(s) (API(s)) that may assign computing task(s) to whichever one(s) of the multiple types of the processing circuitry is/are best suited to execute the computing task(s).

As used herein, unless otherwise stated, the term "above" describes the relationship of two parts relative to Earth. A first part is above a second part, if the second part has at least one part between Earth and the first part. Likewise, as used herein, a first part is "below" a second part when the first part is closer to the Earth than the second part. As noted above, a first part can be above or below a second part with one or more of: other parts therebetween, without other parts therebetween, with the first and second parts touching, or without the first and second parts being in direct contact with one another.

As used herein, the orientation of features is described with reference to a lateral axis, a vertical axis, and a longitudinal axis of the vehicle and/or the trailer associated with the features. As used herein, the longitudinal axis of the vehicle is parallel to a centerline of the vehicle. The terms "rear" and "front" are used to refer to directions along the longitudinal axis closer to the rear of the vehicle and the front of the vehicle, respectively. As used herein, the vertical axis of the vehicle is perpendicular to the ground on which the vehicle rests. As used herein, the lateral axis of the vehicle is perpendicular to the longitudinal and vertical axes and is generally parallel to the axles of the vehicle. As used herein, the terms "longitudinal," and "axial" are used interchangeably to refer to directions parallel to the longitudinal axis. As used herein, the terms "lateral" and "horizontal" are used to refer to directions parallel to the lateral axis. As used herein, the term "vertical" and "normal" are used interchangeably to refer to directions parallel to the vertical axis.

Towed trailers enable vehicle users to tow a greater amount of cargo than permitted by the normal storage areas of the vehicle (e.g., the trunk, etc.). The distribution of cargo on a trailer contributes to the stability and handling of the coupled vehicle. For example, if too small a portion of the load of the trailer is transferred to the vehicle, the weight distribution can cause unlinked oscillation between the trailer and the vehicle (e.g., porpoising, etc.), which can have negative effects on braking and stability of the vehicle. If too great a portion of the load of the trailer is transferred to the vehicle, the trailer can sway, which can negatively affect vehicle handling and stability. Traditionally, vehicle operators rely on trial and error and rules of thumb to ensure the weight distribution of the trailer enables comfortable operation of the vehicle.

Examples disclosed herein overcome the above-noted deficiencies using trailers with adjustable batteries. Examples disclosed herein include electrified trailers with coupled battery arrays, which can move relative to the platform of the trailer via a drive, thereby changing the weight distribution of the trailer. In some examples disclosed herein, in response to user input and/or vehicle ignition, the weight distribution of the trailer can be determined. In some such examples disclosed herein, the determined weight distribution can be compared to a weight distribution threshold. In some such examples disclosed herein, if the weight distribution threshold is not satisfied, the position of the batteries can be adjusted until the weight distribution threshold is satisfied. In some examples disclosed herein, the vehicle can detect an event that could potentially cause the vehicle to be destabilized. In some such examples disclosed herein, the position of the batteries can be adjusted to mitigate the detected event.

FIG. 1 is a top view of an example vehicle 100 and an example trailer 102 coupled via an example tongue 104. In the illustrated example of FIG. 1, the trailer 102 includes an example trailer controller 106, an example platform 108, an example battery 110, an example battery area 112, example wheels 114, an example drive 115, and example trailer sensors 116. In the illustrated example, of FIG. 1, the tongue 104 includes example tongue sensors 118 and the vehicle 100 includes example vehicle sensors 120.

The vehicle 100 is a motorized wheel-driven vehicle. In the illustrated example of FIG. 1, the vehicle 100 is a pick-up truck. In other examples, the vehicle 100 can be any type of wheeled vehicle (e.g., a sedan, a coupe, a van, a semi-tractor, a sports utility vehicle, an all-terrain vehicle (ATV), farming equipment, etc.). In the illustrated example of FIG. 1, the vehicle 100 is an electrified vehicle (e.g., a fully electric vehicle, a partially electrified vehicle, a hybrid vehicle, etc.), which draws power from the battery 110. In such examples, the vehicle 100 includes one or more electric motors (not illustrated) and/or one or more batteries arrays (not illustrated) in addition to the battery 110. In some examples, the vehicle 100 includes an internal combustion engine (e.g., a non-electrified vehicle, a partially electrified vehicle, etc.). While examples disclosed herein are described with reference to a consumer vehicle (e.g., a pick-up truck, etc.), the examples disclosed herein can also be implemented on a commercial vehicle (e.g., a semi-tractor, etc.).

In the illustrated example of FIG. 1, the vehicle 100 includes a hitch (not illustrated) including the tongue 104 protruding axially from the rear of the vehicle 100. The tongue 104 can include features (e.g., a hitch ball, etc.) to receive corresponding features of the trailer 102. In the illustrated example of FIG. 1, the trailer 102 is coupled to the vehicle 100 via the tongue 104. In the illustrated example of FIG. 1, the tongue 104 forms the only load path between the vehicle 100 and the trailer 102. In some examples, the trailer 102 and the vehicle 100 can additionally be coupled via a slack chain, which is configured to go into tension in the event the trailer 102 becomes uncoupled from the tongue 104. In some examples, the trailer 102 and the vehicle 100 are electrically coupled.

In the illustrated example, the trailer 102 is an uncovered wheeled device towed by the vehicle 100. In other examples, the trailer 102 can be wholly and/or partially enclosed. The trailer 102 can be implemented by an enclosed trailer, an office trailer, a travel trailer, a livestock trailer, etc. In the illustrated example of FIG. 1, the trailer 102 includes the platform 108. In the illustrated example of FIG. 1, the platform 108 is flat surface that can receive cargo (e.g., personal goods, industrial goods, livestock, etc.). In the illustrated example of FIG. 1, the vehicle 100 includes the wheels 114, which transfer a portion of the load associated with the trailer 102 (e.g., the weight of the trailer 102, the weight from the cargo, etc.) to the driving surface. In some examples, the trailer 102 includes a powered axle (e.g., electrically powered by the battery 110, etc.).

In the illustrated example of FIG. 1, the trailer 102 includes the battery 110. The battery 110 can be used to store power for an electric powertrain of the vehicle 100, an electrical powertrain of the trailer 102, the drive 115, and/or any other suitable mechanisms. In the illustrated example of FIG. 1, the trailer 102 includes the drive 115, which moves the battery 110 within the battery area 112 (e.g., relative to the body of the trailer 102, relative to the platform 108, etc.).

The drive 115 can be implemented by one or more linear actuator(s) that do not recoil when loaded (e.g., a ball-screw drive, a roller-screw drive, a power-screw drive, a worm gear drive, etc.). Additionally or alternatively, the drive 115 can be implemented by any suitable mechanical drives, fluid drives (e.g., a hydraulic system, a pneumatic system, etc.), electromagnetic drives, and/or a combination thereof. In some examples, the battery 110 can be implemented by one or more arrays of the batteries. In the illustrated example of FIG. 1, the drive 115 can move the battery 110 in 2-dimensions (2D) within the battery area 112 (e.g., axially and laterally, etc.). In other examples, the drive 115 can move the battery along 1-dimension (1D) within the battery area 112 (e.g., axially, laterally, vertically, etc.) or 3-dimensions (3D) within the battery area 112. In some examples, the trailer 102 can include additional batteries that are statically coupled to the trailer 102. The example trailer 102 is described in additional detail below in conjunction with FIG. 2.

The trailer sensors 116 are sensors associated with the trailer 102. For example, the trailer sensors 116 can include sensors that measure the load transferred to the driving surface by the wheels (e.g., ride height sensors, strain gauges, optical sensors, etc.). In some examples, the trailer sensors 116 can include cameras, wind speed sensors, grade sensors, and/or pressure sensors, (e.g., pitot tubes, etc.). In other examples, the trailer sensors 116 can include any other suitable sensors. The tongue sensors 118 are sensors associated with the tongue 104. For example, the tongue sensors 118 can include one or more load sensors (e.g., piezoelectric sensors, strain gauges, optical sensors, etc.) that permit measuring the tongue weight and/or the axial load on the tongue 104. In some examples, the tongue sensors 118 can include sensors that detect movement of the trailer 102 relative to the vehicle 100, which can be analyzed to determine trailer sway. In other examples, the tongue sensors 118 can include any other suitable sensors. The vehicle sensors 120 are sensors associated with the vehicle 100. For example, the vehicle sensors 120 can include a global position system (GPS) which can detect upcoming road features that require maneuvers of the vehicle 100. In some examples, the vehicle sensors 120 can include a camera (e.g., a back-up camera, a center high-mounted stop lamp (CHMSL) camera, etc.) that can detect other vehicles approaching the vehicle 100. In some examples, the vehicle sensors can include any other suitable sensors.

The trailer controller 106 controls the operation of the trailer 102 and/or the drive 115. For example, the trailer controller 106 can detect a distribution check event (e.g., in response to a user demand, vehicle ignition, upon detecting a load change on the platform 108, etc.) and determine if the battery 110 should be moved. In some examples, the trailer controller 106 can analyze data from the sensors 116, 118, 120 to determine a weight distribution of the trailer 102. In some examples, the trailer controller 106 can determine if the determined weight distribution satisfies a threshold and, based on the threshold comparison, move the battery 110 to increase the stability of the trailer 102. In some examples, the trailer controller 106 can generate an alert for a user of the vehicle 100 to readjust the load on the platform 108. In some examples, the trailer 102 can communicate the weight distribution and/or the load status of the trailer 102 to the user of the vehicle 100 via a mobile device of the user, a lamp (e.g., the CHSML, a taillight, a lamp of the trailer 102, etc.), a speaker of the vehicle (e.g., an external sound exciter, etc.), and/or any other suitable means.

In some examples, during operation of the vehicle 100, the trailer controller 106 can detect an instability event that is currently occurring or may occur in the future. As used herein, an "instability event" refers to an occurring, imminent, or upcoming event that satisfies a stability threshold associated with a reduction of stability of the vehicle 100 and/or the trailer 102. The stability threshold can correspond to an amount of trailer sway (e.g., side-to-side movement of the trailer 102 relative to the vehicle 100, etc.), a change in rollover probability of the vehicle 100, a change in the rollover probability of the trailer 102, a change in the maneuverability of the vehicle 100, etc.). Example instability events can include a pressure wave associated with a passing vehicle, a strong gust of wind, an upcoming maneuver of the vehicle 100, a change in grade of the driving surface, hard braking of the vehicle 100, and/or any other applicable event. In such examples, the trailer controller 106 can cause the drive 115 to maneuver the battery 110 to mitigate the impact of the detected event.

In some examples, the trailer controller 106 can communicate with the drive 115 and/or sensors 116, 118, 120 via a controller area network (CAN) bus of the vehicle 100 and/or a direct wired connection with the drive 115. Additionally or alternatively, the trailer controller 106 can communicate with the drive 115 and/or the sensors 116, 118, 120 via an independent communication system (e.g., a wired electrical connection, a wireless electrical connection, a hydraulic system, a pneumatic system, etc.). Some or all of the components of the trailer controller 106 can be implemented by an electronic control unit of the vehicle 100 (e.g., one or more vehicle controller modules (VCM), one or more domain controller(s), etc.). Additionally or alternatively, some or all of the components of the trailer controller 106 can be implemented by one or more other system(s) of the vehicle 100 (e.g., the electronic stability system (ESC), a powertrain controller, a transmission controller, etc.). In the illustrated example of FIG. 1, the trailer controller 106 is depicted as a component of the vehicle 100. In other examples, the trailer controller 106 can be wholly or partially implemented by a computer device associated with the trailer 102 (e.g., an electronic control unit of the trailer 102, etc.), a device associated with a user of the vehicle 100 (e.g., a mobile device of the user, a personal computer of the user, etc.), and/or a server (e.g., a server of the user, a server associated with the manufacturer of the vehicle 100, a server associated with the manufacturer of the trailer 102, etc.).

Figure 2:
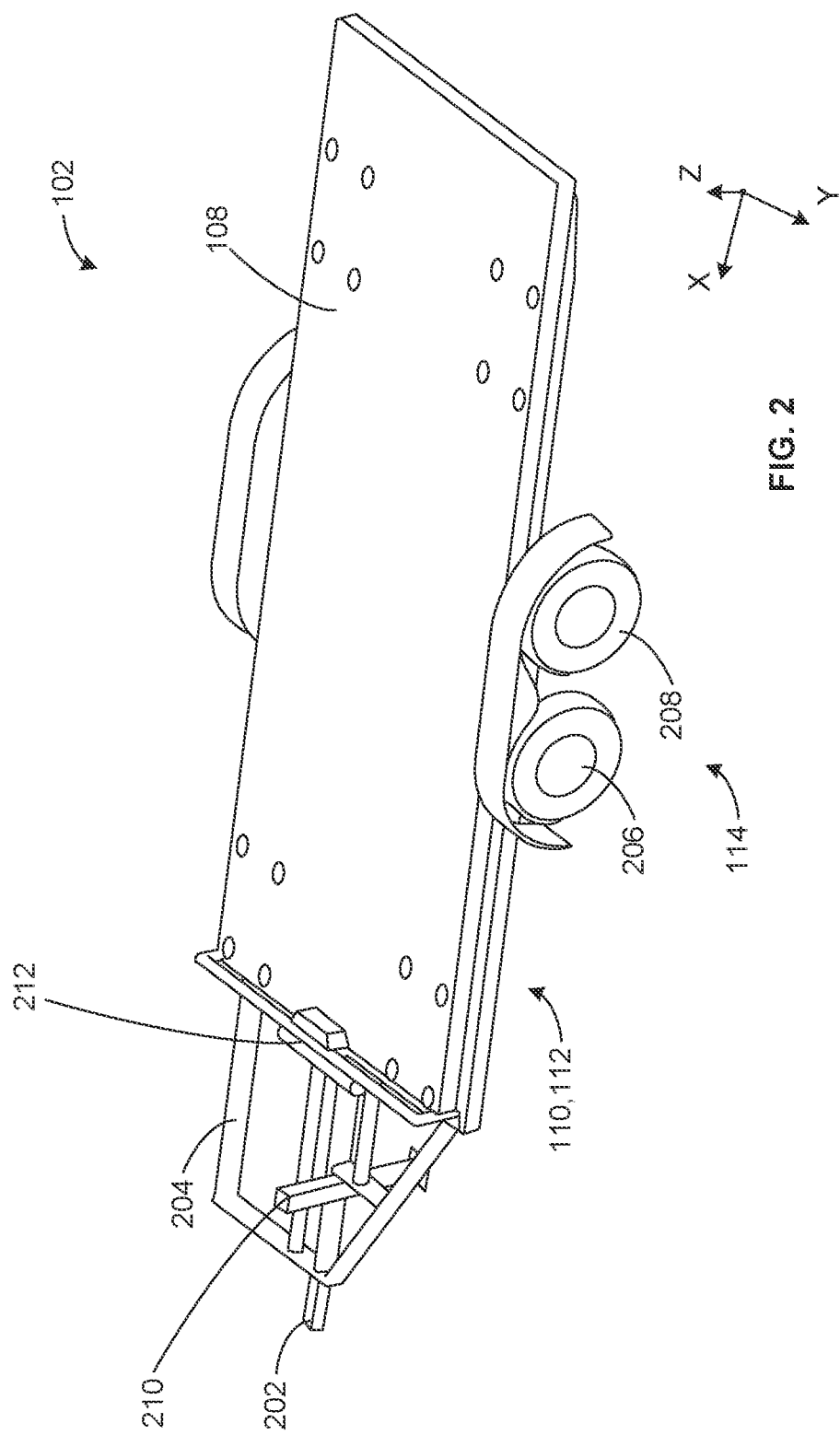
FIG. 2 is an isometric view of the trailer of FIG. 1.

FIG. 2 is an isometric view of the trailer 102 of FIG. 1. In the illustrated example of FIG. 2, the trailer 102 includes the platform 108 of FIG. 1, the battery 110 of FIG. 1, and the battery area 112 of FIG. 1. In the illustrated example of FIG. 2, the trailer 102 also includes an example vehicle mount 202, an example linkage 204, an example first axle 206, and an example second axle 208.

The vehicle mount 202 is an interface that enables the trailer 102 to be coupled to a vehicle 100. For example, the vehicle mount 202 can include a feature (e.g., a hole, etc.) to receive a hitch ball associated with the tongue 104 of FIG. 1. In other examples, the vehicle mount 202 can any other suitable feature to facilitate the coupling of the trailer 102 to the vehicle 100. The vehicle mount 202 is coupled to the body of the trailer (e.g., the platform 108 and related components, etc.) via the linkage 204. In the illustrated example of FIG. 2, the linkage 204 includes a plurality of rails and crossmembers. In other examples, the linkage 204 can have any other suitable structural arrangement and/or composition. In the illustrated example of FIG. 2, the linkage 204 includes an example vertical member 210 that enables the platform 108 to be level when the trailer 102 is not coupled to a vehicle. In some examples, the vertical member 210 is absent. In the illustrated example of FIG. 2, the trailer 102 includes a winch 212, which enables heavy and/or cumbersome cargo to be pulled/secured on the platform 108.

In the illustrated example of FIG. 2, the trailer 102 includes the wheel axles 206, 208, which include the wheels 114 of FIG. 1. In the illustrated example of FIG. 2, the axles 206, 208 are disposed at approximately the axial center of the trailer 102. In other examples, the axles 206, 208 can be disposed at any other suitable locations. In some examples, the trailer 102 can include any suitable number of axles (e.g., one axle, three axles, etc.). In the illustrated example of FIG. 2, the axles 206, 208 are unpowered and undriven. In other examples, one or both of the axles can be powered axles (e.g., electrified axles, etc.).

The platform 108 of the trailer 102 can accommodate a variety of different equipment and/or cargo. In the illustrated example of FIG. 1, the battery 110 and the battery area 112 are disposed beneath the platform 108. In other examples, the battery 110 and/or the battery area 112 can be disposed at any other suitable location of the trailer 102. In some examples, the battery area 112 has substantially the same size and shape as the platform 108. In other examples, the battery area 112 can have any other suitable size and shape. In the illustrated example, movement of the battery 110 changes the center of mass, moments of inertia, and weight distribution of the trailer 102. As such, the movement of the battery 110 affects the stability and responsiveness of the trailer 102 to external instability events and loaded cargo. Accordingly, the movement of the battery 110 can be used to mitigate the effects of loaded cargo and instability events. In some examples, the trailer 102 can include one or more charge ports (not illustrated) that enable power to be drawn from the battery 110.

Figure 3:
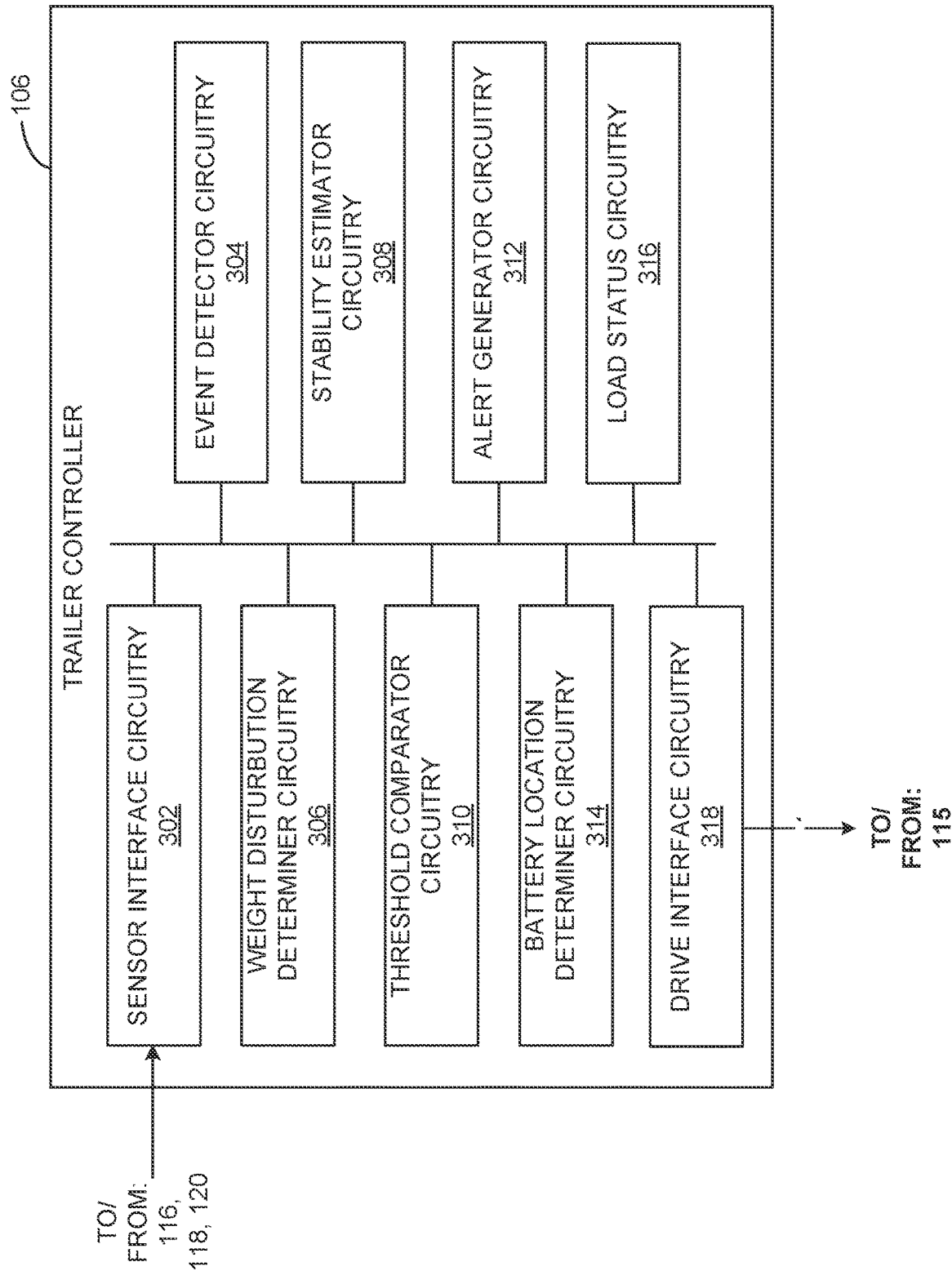
FIG. 3 is a block diagram of the trailer controller of FIG. 1.

FIG. 3 is a block diagram of the trailer controller 106 to control the drive 115 of the trailer 102. The trailer controller 106 of FIG. 3 may be instantiated (e.g., creating an instance of, bring into being for any length of time, materialize, implement, etc.) by processor circuitry such as a central processing unit executing instructions. Additionally or alternatively, the trailer controller 106 of FIG. 3 may be instantiated (e.g., creating an instance of, bring into being for any length of time, materialize, implement, etc.) by an ASIC or an FPGA structured to perform operations corresponding to the instructions. It should be understood that some or all of the circuitry of FIG. 3 may, thus, be instantiated at the same or different times. Some or all of the circuitry may be instantiated, for example, in one or more threads executing concurrently on hardware and/or in series on hardware. Moreover, in some examples, some or all of the circuitry of FIG. 3 may be implemented by one or more virtual machines and/or containers executing on the microprocessor. In the illustrated example of FIG. 3, the trailer controller 106 includes example sensor interface circuitry 302, example event detector circuitry 304, example weight distribution determiner circuitry 306, example stability estimator circuitry 308, example threshold comparator circuitry 310, example alert generator circuitry 312, example battery location determiner circuitry 314, example load status circuitry 316, and example drive interface circuitry 318.

The example sensor interface circuitry 302 receives sensor data from the sensors 116, 118, 120 of the example vehicle 100, the tongue 104, and/or the trailer 102. In some examples, the sensor interface circuitry 302 can transform the received sensor data from a machine-readable format (e.g., a voltage, a current, etc.) to a human-readable format (e.g., a string, a floating-point number, an integer, etc.).

The example event detector circuitry 304 detects events that are/may be experienced by the trailer 102 and/or the vehicle 100 by analyzing the sensor data accessed by the sensor interface circuitry 302. For example, the event detector circuitry 304 can detect a distribution check event. As used here, a "distribution check event" refers to an event that causes the trailer controller 106 to check the weight distribution of the trailer 102. In some examples, a distribution check event can be associated with a user input (e.g., a user input to trailer controller 106 check the weight distribution of the trailer 102, etc.), ignition of the vehicle 100, and/or a detected change in the loading of the trailer 102. In some examples, the event detector circuitry 304 can also detect an instability event that may cause trailer 102 and/or vehicle instability. For example, the event detector circuitry 304 can detect an approaching vehicle that may cause the trailer 102 to sway, a strong gust of wind, an upcoming vehicle turning maneuver, a hard braking event, a long negative graduate section of road, etc. In other examples, the event detector circuitry 304 can detect another type of instability event that could reduce the stability of the vehicle 100 and/or the trailer 102. Examples of events that could be detected by the event detector circuitry 304 are described below in conjunction with FIGS. 5A, 5B, and 6.

The example weight distribution determiner circuitry 306 determines the current weight distribution of the trailer 102 based on the sensor data accessed by the example sensor interface circuitry 302. For example, the weight distribution determiner circuitry 306 can determine a first load portion transferred to the vehicle 100 via the vehicle mount 202 and a second load portion transferred to the driving surface transferred to the ground via the wheels 114. In some examples, the weight distribution determiner circuitry 306 can determine the total load associated with the trailer 102 and the corresponding percentages associated with the determined load portions. That is, in some examples, the weight distribution determiner circuitry 306 can determine the percentage of the total load of the trailer 102 carried by vehicle mount 202 and the percentage of the total load of the trailer 102 carried by the wheels 114. The function of the weight distribution determiner circuitry 306 is described below in conjunction with FIG. 4.

The example stability estimator circuitry 308 estimates the effect an instability event detected by the event detector circuitry 304 will have on the stability of the vehicle 100 and/or the trailer 102. For example, the stability estimator circuitry 308 can estimate the effect the event will have on the stability of the vehicle 100 and/or the trailer 102 (e.g., the static stability factor of the vehicle 100, the directional stability of the vehicle 100, the directional stability of the trailer 102, a reduction in a maneuverability of the vehicle 100, etc.). Additionally or alternatively, the stability estimator circuitry 308 can estimate a magnitude (e.g., an angular displacement, a linear displacement, etc.) of a sway of the trailer 102 that will occur or which is occurring. Additionally or alternatively, the example stability estimator circuitry 308 can estimate the vehicle stability effects in any other suitable manner.

The example threshold comparator circuitry 310 compares the weight distribution of the trailer 102, as determined by the example weight distribution determiner circuitry 306, to determine if the battery 110 should be moved and/or if an alert should be generated. For example, the threshold comparator circuitry 310 can compare a load portion associated with the tongue 104 to a threshold percentage (e.g., 10% of the total load of the trailer 102, 15% of the total load of the trailer 102, 20% of the total load of the trailer 102, etc.) and determine if the portion of the load of the trailer 102 transferred by the vehicle mount is within normal operating parameters. In some examples, the threshold comparator circuitry 310 can determine if the portion of the load of the trailer 102 is within a threshold range (e.g., 10%-15% of the total load of the trailer 102, etc.). In other examples, the threshold comparator circuitry 310 can compare another aspect of the weight distribution (e.g., the total load, the portion of the weight carried by the wheels 114, etc.) to another suitable threshold. In some examples, if the weight distribution does not satisfy the load threshold, the threshold comparator circuitry 310 can interface with the battery location determiner circuitry 314 to move the battery 110 to mitigate the weight distribution. In some examples, if the battery 110 has already been moved, the threshold comparator circuitry 310 can interface with the alert generator to generate an alert for the user to relocate the cargo.

In some examples, the threshold comparator circuitry 310 can compare the potential stability change estimated by the stability estimator circuitry 308 to determine if a stability threshold is satisfied. In some such examples, the stability threshold used by the threshold comparator circuitry 310 can be based on a desired stability of the vehicle 100 and/or the trailer 102 (e.g., a likelihood of the trailer 102 overturning, a reduction in the maneuverability of the vehicle 100, etc.). In other examples, the threshold comparator circuitry 310 can be based on a user setting and/or manufacturer setting (e.g., the manufacturer of the vehicle 100, the manufacturer of the trailer 102, the manufacturer of the battery 110, etc.). In other examples, the threshold comparator circuitry 310 can use any other suitable threshold.

The example alert generator circuitry 312 generates an alert to the user of the vehicle 100 to rearrange cargo loaded on the trailer 102. For example, the alert generator circuitry 312 can, via a display and/or a sound alert, generate an indication that the load on the trailer 102 should be rearranged and/or removed. In some examples, the alert generator circuitry 312 can display an indication to the user via a mobile device of the user, a lamp (e.g., the CHSML, a taillight, a lamp of the trailer 102, etc.), a speaker of the vehicle (e.g., an external sound exciter, etc.), and/or any other suitable means. In some examples, the alert generator circuitry 312 can only generate an alert if moving the battery 110 does not allow the weight distribution to satisfy the threshold of the threshold comparator circuitry 310.

The battery location determiner circuitry 314 can determine a location to which the battery 110 is to be moved to compensate for the weight distribution of the trailer 102 and/or mitigate a detected event. For example, if the portion of the load on the vehicle mount is higher than the load threshold, the battery location determiner circuitry 314 can determine the battery 110 should be moved away from the vehicle mount 202. If the portion of the load on the vehicle mount is lower than the load threshold, the battery location determiner circuitry 314 can determine the battery 110 should be moved toward the vehicle mount 202. In some examples, the battery location determiner circuitry 314 can use a look-up table to determine the appropriate position of the battery 110 in the battery area 112.

The battery location determiner circuitry 314 can also determine a battery position within the battery area 112 that mitigates an imminent event. For example, the battery location determiner circuitry 314 can determine the battery 110 should be moved towards a high-pressure wave generated by an approaching vehicle and/or away from a low-pressure wave generated by a passing vehicle. In some examples, the battery location determiner circuitry 314 can determine the battery 110 should be moved into a direction of a gust of wind to resist the tipping force generated by the gust of wind. In some examples, the battery location determiner circuitry 314 can determine the battery 110 should be moved rearward in response to hard braking by the vehicle 100. In some examples, the battery location determiner circuitry 314 can determine the battery 110 should be moved rearward in response to hard braking by the vehicle 100. In some examples, the battery location determiner circuitry 314 can determine the location using a look-up table using vehicle parameters (e.g., vehicle kinematics, vehicle weight, vehicle load distribution, etc.) and/or event parameters (e.g., the type of event, etc.). Example functions of the battery location determiner circuitry 314 are described below in conjunction with FIGS. 5A, 5B, and 6.

The load status circuitry 316 determines the load status of the trailer 102. For example, the load status circuitry 316 can determine a load status of the vehicle 100. For example, the load status determined by the load status circuitry 316 can include the weight distribution determined by the weight distribution determiner circuitry 306, the total cargo load on the trailer 102 and/or if the cargo is secured to the trailer 102. In some examples, the load status circuitry 316 can cause the load status to be displayed to a user of the vehicle 100 via a mobile device of the user, a lamp of the vehicle, and/or an auditory alert.

The drive interface circuitry 318 interfaces with the drive 115 to move the battery 110. For example, the drive interface circuitry 318 can cause the drive 115 (e.g., via a command issued via wired connection between the trailer controller 106 and the drive 115, via a command issued via a wireless connection between the drive 115, etc.) to move the battery 110 into a position determined by the battery location determiner circuitry 314. In other examples, the drive interface circuitry 318 can cause the drive 115 to operate by any other suitable means.

While an example manner of implementing the trailer controller 106 of FIG. 1 is illustrated in FIG. 3, one or more of the elements, processes, and/or devices illustrated in FIG. 3 may be combined, divided, re-arranged, omitted, eliminated, and/or implemented in any other way. Further, the example sensor interface circuitry 302, the example event detector circuitry 304, the example weight distribution determiner circuitry 306, the example stability estimator circuitry 308, example threshold comparator circuitry 310, the example alert generator circuitry 312, the example battery location determiner circuitry 314, the example load status circuitry 316, the example drive interface circuitry 318, and/or, more generally, the example trailer controller 106 of FIGS. 1 and/or 3, may be implemented by hardware alone or by hardware in combination with software and/or firmware. Thus, for example, any of the example sensor interface circuitry 302, the example event detector circuitry 304, the example weight distribution determiner circuitry 306, the example stability estimator circuitry 308, example threshold comparator circuitry 310, the example alert generator circuitry 312, the example battery location determiner circuitry 314, the example load status circuitry 316, the example drive interface circuitry 318, and/or, more generally, the example trailer controller 106, could be implemented by processor circuitry, analog circuit(s), digital circuit(s), logic circuit(s), programmable processor(s), programmable microcontroller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)) such as Field Programmable Gate Arrays (FPGAs). Further still, the example trailer controller 106 of FIG. 1 may include one or more elements, processes, and/or devices in addition to, or instead of, those illustrated in FIG. 3, and/or may include more than one of any or all of the illustrated elements, processes and devices.

Figure 4:
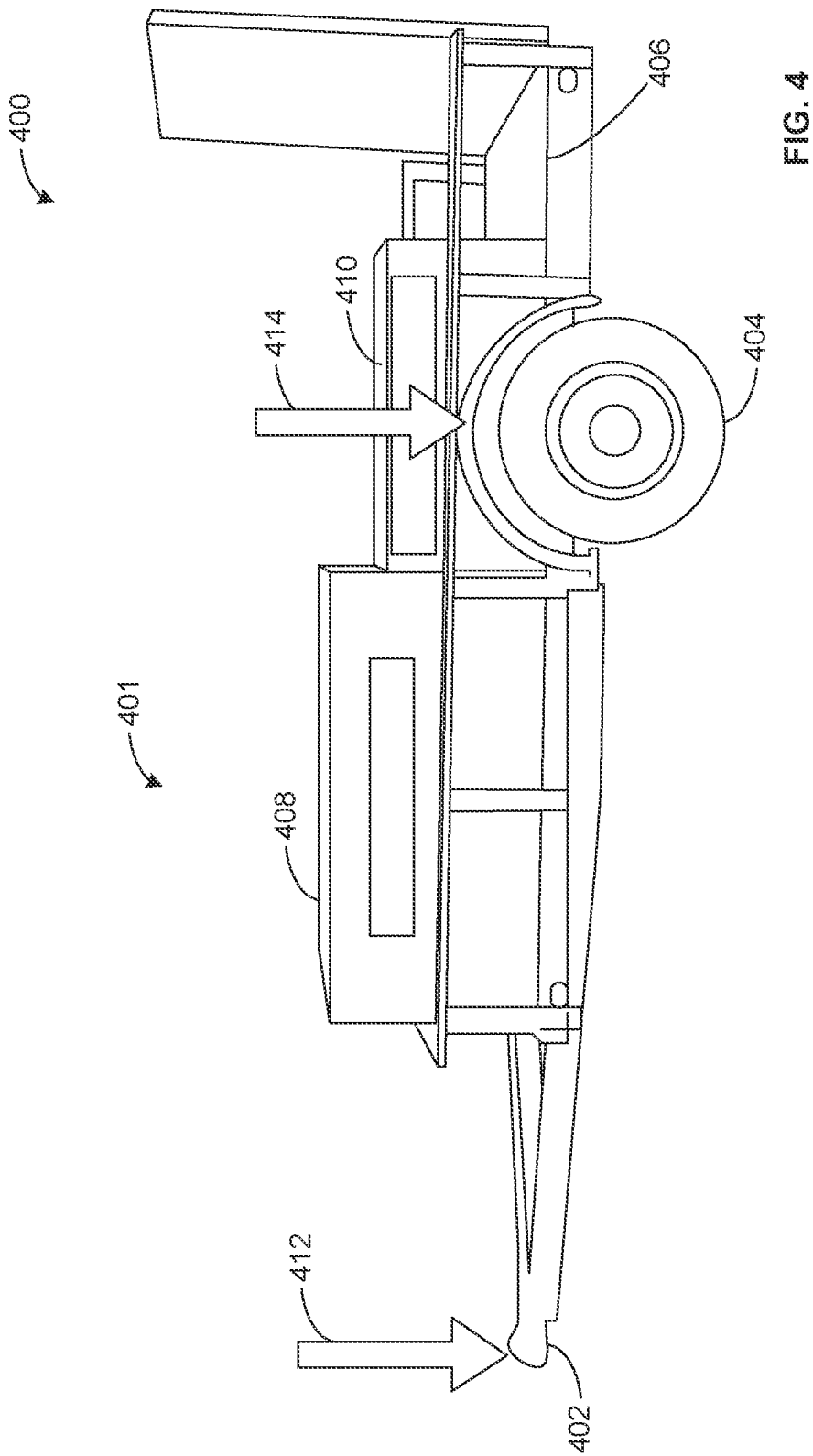
FIG. 4 is a side view of an example trailer illustrating an example weight distribution.

FIG. 4 is a side view of an example trailer 400 illustrating an example weight distribution 401. In the illustrated example of FIG. 4, the trailer 400 includes an example vehicle interface 402, example wheels 404, and an example platform 406. In the illustrated example of FIG. 4, the example platform 406 is loaded with example first cargo 408 and example second cargo 410. In the illustrated example of FIG. 4, the cargo 408, 410, and weight of the trailer 400 is causing an example first load portion 412 on the vehicle interface 402 and an example second load portion 414 on the wheels 404. The trailer 400, the vehicle interface 402, the wheels 404, and the platform 406 described with reference to FIG. 4 are analogous to the trailer 102 of FIGS. 1 and 2, the vehicle mount 202 of FIG. 2, the wheels 114 of FIGS. 1 and 2, and the platform 108 of FIGS. 1 and 2 unless described otherwise.

The weight distribution 401 includes the first load portion 410 and the second load portion 412. In the illustrated example of FIG. 4, the sum of the load portions 410, 412 is equal to the sum of the weights of the trailer 400 and the cargo 408, 410. Generally, to ensure the stability of the trailer 400 and handling of a vehicle coupled thereto, the first load portion 410 should be between 10% and 15% of the total weight associated with the weight distribution 401. In some examples, to increase the relative size of the first load portion 412, the center of mass of the trailer 400 can be moved axially towards the vehicle interface 402. In some examples, to increase the relative size of the second load portion 414, the center of mass of the trailer 400 can be moved axially away from the vehicle interface 412. In some examples, the location of the center of mass of the trailer 400 can be adjusted by rearranging the cargo 408, 410. The location of the center of mass of the trailer 102 of FIGS. 1 and 2 can be similarly adjusted by rearranging cargo load thereon and/or moving the location of the battery 110 axially forward and backward to increase the relative size of the load carried by the vehicle mount 202 and the wheels 114, respectively.

Figure 5A:
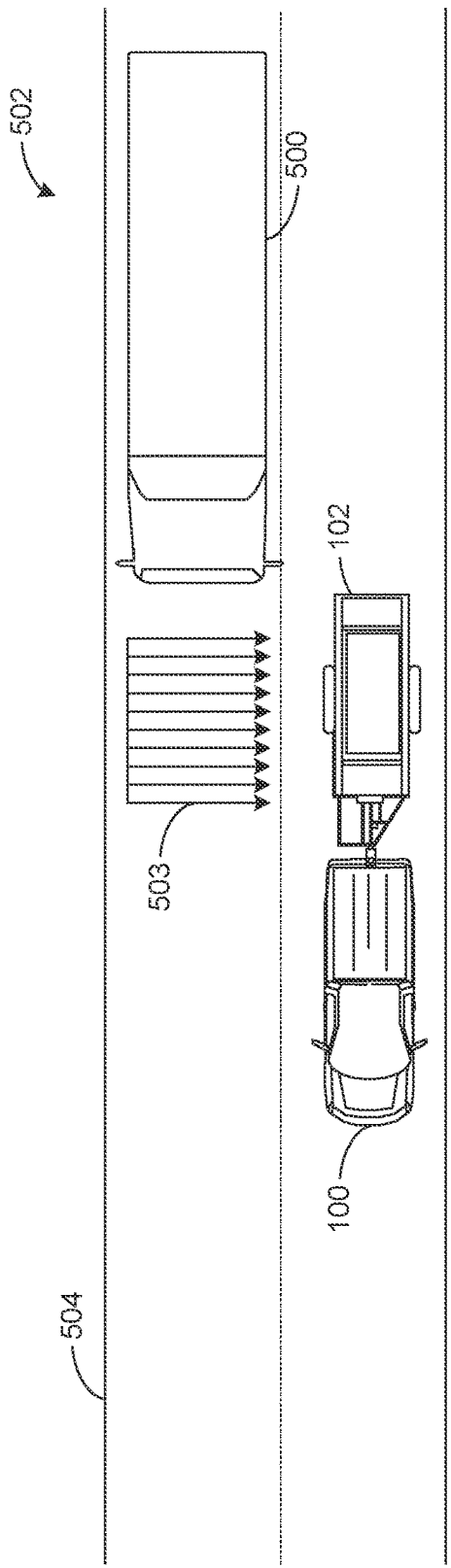
FIGS. 5A and 5B illustrate an example first event and associated functions of the trailer controller of FIGS. 1 and 3.
Figure 5B:
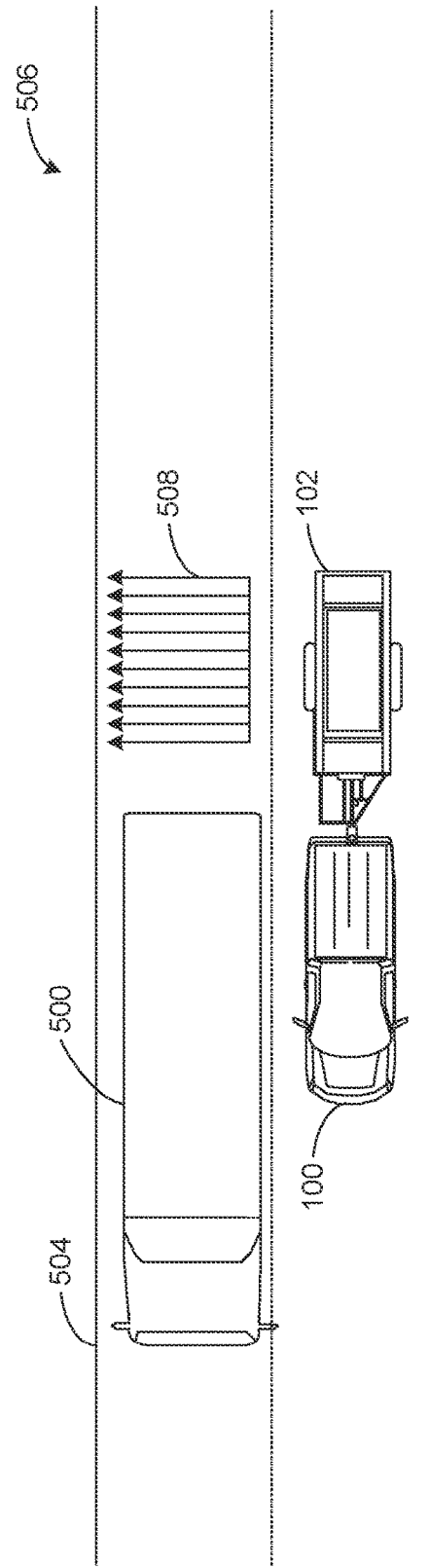

FIGS. 5A and 5B illustrate the vehicle 100 of FIG. 1 during an event that may cause instability of the vehicle 100 and/or the trailer 102. In the illustrated example of FIGS. 5A and 5B, the vehicle 100 is being passed by an example second vehicle 500 on an example multilane road 504. In the illustrated example of FIG. 5A, the second vehicle 500 is approaching the vehicle 100 at an example first time 502 and has generated an example high-pressure region 503 adjacent to the vehicle 100. In the illustrated example of FIG. 5B, the second vehicle 500 is passing the front the vehicle 100 at an example second time 506 and is generating an example low-pressure region 508 adjacent to the vehicle 100.

The second vehicle 500 is a relatively large vehicle that is moving faster than the first vehicle 100 on the multilane road 504. In the illustrated example of FIGS. 5A and 5B, the second vehicle 500 is traveling on the same multilane road 504 at a greater speed than the vehicle 100. As the second vehicle 500 approaches and passes the first vehicle 100, the gas dynamics effects of the vehicle 500 can cause events that affect the stability of the vehicle 100 and/or the trailer 102. While the second vehicle 500 is depicted as a semi-truck in the illustrated examples of FIGS. 5A and 5B, the second vehicle 500 can be of any vehicle type and/or have any size.

The first vehicle 100 can detect the second vehicle 500 via the sensors 116, 118, 120. For example, the first vehicle 100 can optically detect the vehicle 100 using a camera of the vehicle sensors 120 and/or the trailer sensors 116. In some examples, the first vehicle 100 can detect the vehicle 100 using radar (e.g., ultra-wide band (UWB) radar, etc.) of the vehicle sensors 120 and/or the trailer sensors 116. Additionally or alternatively, the vehicle 100 can detect the high-pressure region 503 and/or the low-pressure region 508 via a pressure sensor of the sensors 116, 118, 120. In other examples, the trailer controller 106 can detect the vehicle 500 by any other suitable means.

As the second vehicle 500 approaches the vehicle 100 at the first time 502, the relative speed of the second vehicle 500 compresses the air in front of the vehicle 500, thereby generating the high-pressure region 503. The high-pressure region 503 pushes the trailer 102 away from the high-pressure region 503, which can cause the trailer 102 to begin to sway. In some examples, to compensate for the high-pressure region 503, the trailer controller 106 can detect the approaching second vehicle 500 and move the battery 110 laterally towards from high-pressure region 503. In other examples, the trailer controller 106 can cause the battery 110 to move in any other suitable direction.

As the second vehicle 500 passes from the vehicle 100 at the second time 506, the air behind the second vehicle 500 expands to leave the area formerly occupied by the second vehicle 500, thereby generating the low-pressure region 508. The low-pressure region 508 pulls the trailer 102 toward the low-pressure region 508, which can cause the trailer 102 to begin to sway and/or continue to sway from the previous high-pressure region 503. In some examples, to compensate for the low-pressure region 508, the trailer controller 106 can detect the second vehicle 500 and move the battery 110 laterally away from the low-pressure region 508. In other examples, the trailer controller 106 can cause the battery 110 to move in any other suitable direction. In some examples, the trailer controller 106 (e.g., the weight distribution determiner circuitry 306, etc.) can use a look-up table to determine the appropriate position of the battery 110 at the first time 500 and/or the second time 506 based on a front area of the second vehicle 500, the speed of the second vehicle 500 compared to the first vehicle 100, and the speed of the trailer 102.

FIG. 6 illustrates the vehicle 100 of FIG. 1 on the road 504 of FIG. 5. In the illustrated example of FIG. 6, the vehicle 100 is being acted upon by an example wind gust 600. In the illustrated example of FIG. 6, the wind gust 600 is detected by the sensors (e.g., the sensors 116, 118, 120, etc.) associated with the vehicle 100 and/or the trailer 102. In some examples, the trailer controller 106 can determine if the wind gust 600 is likely to cause the trailer 102 to overturn and/or significantly affect the stability and/or handling of the vehicle 100. In some examples, to compensate for the wind gust 600, the trailer controller 106 can shift the battery 110 towards the wind gust 600 to reduce the likelihood of the wind gust overturning the trailer 106.

Figure 7:
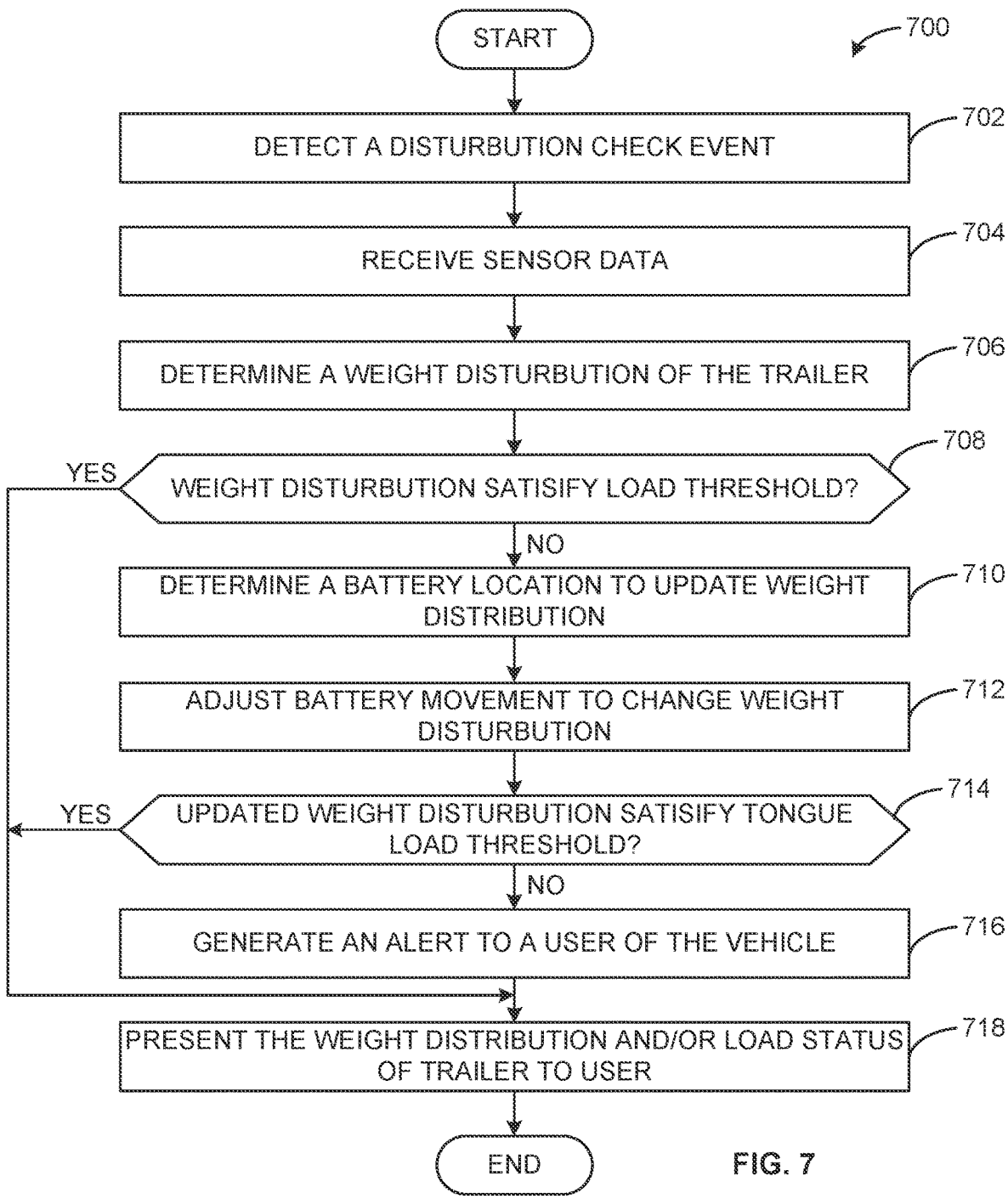
FIGS. 7 and 8 is a flowchart representative of example machine readable instructions and/or example operations that may be executed by example processor circuitry to implement the trailer controller of FIGS. 1 and/or 3.
Figure 8:
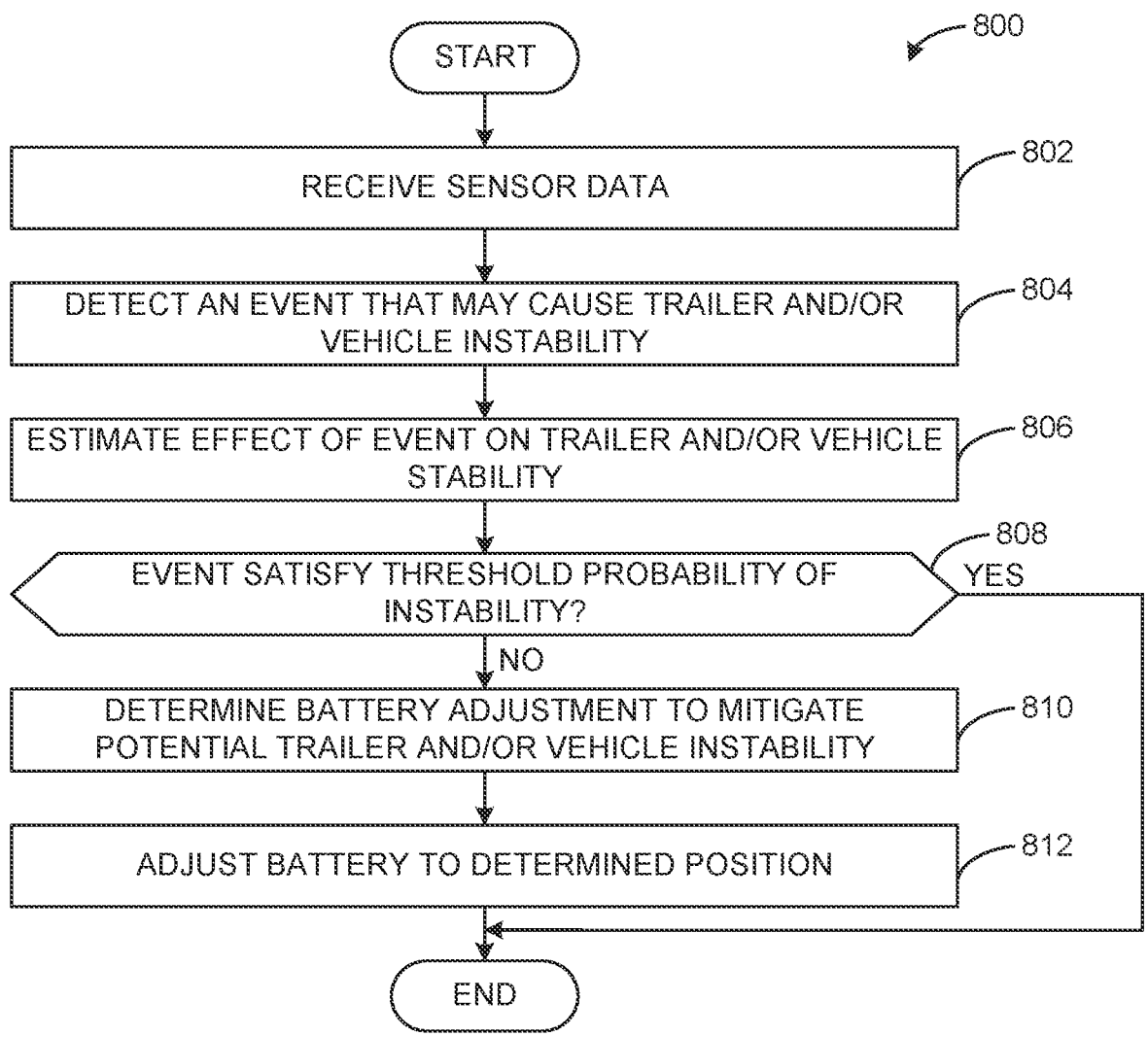

Flowcharts representative of example hardware logic circuitry, machine readable instructions, hardware implemented state machines, and/or any combination thereof for implementing the trailer controller 106 of FIGS. 1 and 3 are shown in FIGS. 7 and 8. The machine readable instructions may be one or more executable programs or portion(s) of an executable program for execution by processor circuitry, such as the processor circuitry 912 shown in the example processor platform 900 discussed below in connection with FIG. 9 and/or the example processor circuitry discussed below in connection with FIGS. 10 and/or 11. The program may be embodied in software stored on one or more non-transitory computer readable storage media such as a compact disk (CD), a floppy disk, a hard disk drive (HDD), a solid-state drive (SSD), a digital versatile disk (DVD), a Blu-ray disk, a volatile memory (e.g., Random Access Memory (RAM) of any type, etc.), or a non-volatile memory (e.g., electrically erasable programmable read-only memory (EEPROM), FLASH memory, an HDD, an SSD, etc.) associated with processor circuitry located in one or more hardware devices, but the entire program and/or parts thereof could alternatively be executed by one or more hardware devices other than the processor circuitry and/or embodied in firmware or dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a user) or an intermediate client hardware device (e.g., a radio access network (RAN)) gateway that may facilitate communication between a server and an endpoint client hardware device). Similarly, the non-transitory computer readable storage media may include one or more mediums located in one or more hardware devices. Further, although the example program is described with reference to the flowcharts illustrated in FIGS. 7 and 8, many other methods of implementing the example trailer controller 106 may alternatively be used. For example, the order of execution of the blocks may be changed, and/or some of the blocks described may be changed, eliminated, or combined. Additionally or alternatively, any or all of the blocks may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more hardware devices (e.g., a single-core processor (e.g., a single core central processor unit (CPU)), a multi-core processor (e.g., a multi-core CPU), etc.) in a single machine, multiple processors distributed across multiple servers of a server rack, multiple processors distributed across one or more server racks, a CPU and/or a FPGA located in the same package (e.g., the same integrated circuit (IC) package or in two or more separate housings, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., as portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of machine executable instructions that implement one or more operations that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc., in order to execute the machine readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C #, Perl, Python, JavaScript, HyperText Markup Language (HTML), Structured Query Language (SQL), Swift, etc.

As mentioned above, the example operations of FIGS. 7 and 8 may be implemented using executable instructions (e.g., computer and/or machine readable instructions) stored on one or more non-transitory computer and/or machine readable media such as optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms non-transitory computer readable medium and non-transitory computer readable storage medium are expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

FIG. 7 is a flowchart representative of example machine readable instructions and/or example operations 700 that may be executed and/or instantiated by processor circuitry to move the battery 110 to change the weight distribution of the trailer 102. The machine readable instructions and/or the operations 700 of FIG. 7 begin at block 702, the event detector circuitry 304 detects a distribution check event. For example, the event detector circuitry 304 can detect a distribution check event. In some examples, a distribution check event can be associated with a user input (e.g., a user input to trailer controller 106 check the weight distribution of the trailer 102, etc.), ignition of the vehicle 100, and/or a detected change in the loading of the trailer 102. In other examples, the event detector circuitry 304 can detect a weight distribution check event by any other suitable means.

At block 704, the sensor interface circuitry 302 accesses sensor data. For example, the sensor interface circuitry 302 receives sensor data from the sensors 116, 118, 120 of the example vehicle 100, the tongue 104, and/or the trailer 102. In some examples, the sensor interface circuitry 302 can transform the received sensor data from a machine-readable format (e.g., a voltage, a current, etc.) to a human-readable format (e.g., a string, a floating-point number, an integer, etc.).

At block 706, the weight distribution determiner circuitry 306 determines a weight distribution of an attached trailer. For example, weight distribution determiner circuitry 306 can determine a first load portion transferred to the vehicle 100 via the vehicle mount 202 (e.g., the first load portion 412 of FIG. 4, etc.) and a second load portion transferred to the driving surface via the transferred to the ground via the wheels 114 (e.g., the second load portion 414 of FIG. 4, etc.). In some examples, the weight distribution determiner circuitry 306 can determine the total load associated with the trailer 102 and the corresponding percentages associated with the determined load portions. That is, in some examples, the weight distribution determiner circuitry 306 can determine the percentage of the total load of the trailer 102 carried by vehicle mount 2021 and the percentage of the total load of the trailer 102 carried by the wheels 114.

At block 708, the threshold comparator circuitry 310 determines if the weight distribution load satisfies the threshold. For example, the threshold comparator circuitry 310 can compare a load portion associated with the tongue 104 to a threshold percentage (e.g., 10% of the total load of the trailer 102, 15% of the total load of the trailer 102, 20% of the total load of the trailer 102, etc.) and determine if the portion of the load of the trailer 102 transferred by the vehicle mount within normal operating parameters. In some examples, the threshold comparator circuitry 310 can determine the portion of the load of the trailer 102 is within a threshold range (e.g., 10%-15% of the total load of the trailer 102, etc.). In other examples, the threshold comparator circuitry 310 can compare another aspect of the weight distribution (e.g., the total load, the portion of the weight carried by the wheels 114, etc.) to another suitable threshold. If the threshold comparator circuitry 310 determines the weight distribution satisfies the threshold the operations 700 advance to block 718. If the threshold comparator circuitry 310 determines the weight distribution does not satisfy the threshold, the operations 700 advance to block 710.

At block 710, the battery location determiner circuitry 314 determines the battery adjustment to change the weight distribution. For example, if the portion of the load on the vehicle mount is higher than the load threshold, the battery location determiner circuitry 314 can determine the battery 110 should be moved away from the vehicle mount 202. If the portion of the load on the vehicle mount is lower than the load threshold, the battery location determiner circuitry 314 can determine the battery 110 should be moved away from the vehicle mount 202. In some examples, the battery location determiner circuitry 314 can use a look-up table to determine the appropriate position of the battery 110 in the battery area 12.

At block 712, the drive interface circuitry 318 adjusts the battery movement to change the weight distribution. For example, the drive interface circuitry 318 can cause the drive 115 (e.g., via a command issued via wired connection between the trailer controller 106 and the drive 115, via a command issued via a wireless connection between the drive 115, etc.) to move the battery 110 into a position determined by the battery location determiner circuitry 314. In other examples, the drive interface circuitry 318 can cause the drive 115 to operate by any other suitable means.

At block 714, the threshold comparator circuitry 310 determines if the updated weight distribution tongue load satisfies the threshold. For example, the threshold comparator circuitry 310 can compare a load portion of the updated weight distribution associated with the tongue 104 to a threshold percentage (e.g., 10% of the total load of the trailer 102, 15% of the total load of the trailer 102, 20% of the total load of the trailer 102, etc.) and determine if the portion of the load of the trailer 102 transferred by the vehicle mount within normal operating parameters. In some examples, the threshold comparator circuitry 310 can determine the portion of the load of the trailer 102 is within a threshold range (e.g., 10%-15% of the total load of the trailer 102, etc.). In other examples, the threshold comparator circuitry 310 can compare another aspect of the weight distribution (e.g., the total load, the portion of the weight carried by the wheels 114, etc.) to another suitable threshold. If the threshold comparator circuitry 310 determines the updated weight distribution satisfies the threshold the operations 700 advance to block 718. If the threshold comparator circuitry 310 determines the updated weight distribution does not satisfy the threshold, the operations 700 advance to block 716.

At block 716, the alert generator circuitry 312 generates an alert to a user of the vehicle to readjust the cargo on the trailer. For example, the alert generator circuitry 312 can, via a display and/or a sound alert, generate an indication that the load on the trailer 102 should be rearranged and/or removed. In some examples, the alert generator circuitry 312 can display an indication to the user via a mobile device of the user, a lamp (e.g., the CHSML, a taillight, a lamp of the trailer 102, etc.), a speaker of the vehicle (e.g., an external sound exciter, etc.), and/or any other suitable means. In some examples, the alert generator circuitry 312 can only generate an alert if moving the battery 110 does not bring the weight distribution within the threshold of the threshold comparator circuitry 310.

At block 718, the load status circuitry 316 presents the weight distribution and/or load status of the trailer to a user of the vehicle 100. For example, the load status determined by the load status circuitry 316 can include the weight distribution determined by the weight distribution determiner circuitry 306, the total cargo load on the trailer 102 and/or if the cargo is secured to the trailer 102. In some examples, the load status circuitry 316 can cause the load status to be displayed to a user of the vehicle 100 via a mobile device of the user, a lamp of the vehicle, and/or an auditory alert. The operations 700 end.

FIG. 8 is a flowchart representative of example machine readable instructions and/or example operations 800 that may be executed and/or instantiated by processor circuitry to mitigate a detected event by moving the battery 110. The machine readable instructions and/or the operations 800 of FIG. 8 begin at block 802, at which the sensor interface circuitry 302 accesses sensor data. For example, the sensor interface circuitry 302 receives sensor data from the sensors 116, 118, 120 of the example vehicle 100, the tongue 104, and/or the trailer 102. In some examples, the sensor interface circuitry 302 can transform the received sensor data from a machine-readable format (e.g., a voltage, a current, etc.) to a human-readable format (e.g., a string, a floating-point number, an integer, etc.).

At block 804, the event detector circuitry 304 detects an event that may cause trailer and/or vehicle instability. For example, the event detector circuitry 304 can detect an approaching vehicle that may cause the trailer 102 to sway, a strong gust of wind, an upcoming vehicle turning maneuver, a hard braking event, a long negative graduate section of road, etc. In other examples, the event detector circuitry 304 can detect another type of event that could reduce the stability of the vehicle 100 and/or the trailer 102. In some examples, the event detector circuitry 304 can detect the event based on the sensor data accessed by the sensor interface circuitry 302. In other examples, the event detector circuitry 304 can detect the event by any other suitable means (e.g., via a user input, etc.).

At block 806, the stability estimator circuitry 308 estimates an effect of the detected event on the trailer and/or vehicle stability. event detector circuitry 304 will have on the stability of the vehicle 100 and/or the trailer 102. For example, the stability estimator circuitry 308 can estimate the effect the event will have on the stability of the vehicle 100 and/or the trailer 102 (e.g., the static stability factor of the vehicle 100, the directional stability of the vehicle 100, the directional stability of the trailer 102, a reduction in a maneuverability of the vehicle 100, etc.). Additionally or alternatively, the stability estimator circuitry 308 can estimate a magnitude (an angular displacement, a linear displacement, etc.) of a sway of the trailer 102 that will/is occurring.

At block 808, the threshold comparator circuitry 310 determines if the detected event satisfies threshold probability of instability. For example, the threshold comparator circuitry 310 can compare the potential stability change estimated by the stability estimator circuitry 308 to determine if a stability threshold is satisfied. In some such examples, the stability threshold used by the threshold comparator circuitry 310 can be based on a desired stability of the vehicle 100 and/or the trailer 102 (e.g., a particular likelihood of the trailer 102 overturning, a particular reduction in the maneuverability of the vehicle 100, etc.). In other examples, the threshold comparator circuitry 310 can be based on a user setting and/or manufacturer setting (e.g., the manufacturer of the vehicle 100, the manufacturer of the trailer 102, the manufacturer of the battery 110, etc.). In other examples, the threshold comparator circuitry 310 can use any other suitable threshold. If the threshold comparator circuitry 310 determines the event satisfies the threshold, the operations 800 end. If the threshold comparator circuitry 310 determines the event does not satisfy the threshold, the operations advance to block 810.

At block 810, the battery location determiner circuitry 314 determines the battery adjustment to mitigate the potential trailer and/or vehicle instability. For example, the battery location determiner circuitry 314 can determine the battery 110 should be moved towards a high-pressure wave generated by an approaching vehicle and/or away from a low-pressure wave generated by a departing vehicle. In some examples, the battery location determiner circuitry 314 can determine the battery 110 should be moved into a direction of a gust of wind to resist the tipping force generated by a gust of wind. In some examples, the battery location determiner circuitry 314 can determine the battery 110 should be moved rearward in response to hard braking by the vehicle 100. In some examples, the battery location determiner circuitry 314 can determine the battery 110 should be moved rearward in response to hard braking by the vehicle 100. In some examples, the battery location determiner circuitry 314 can determine the location using a look-up table using vehicle parameters (e.g., vehicle kinematics, vehicle weight, vehicle load distribution, etc.) and/or event parameters (e.g., the type of event, etc.).

At block 812, the drive interface circuitry 318 adjusts the battery to the determined position. For example, the drive interface circuitry 318 adjusts the battery movement to mitigate the detected event. For example, the drive interface circuitry 318 can cause the drive 115 (e.g., via a command issued via wired connection between the trailer controller 106 and the drive 115, via a command issued via a wireless connection between the drive 115, etc.) to move the battery 110 into a position determined by the battery location determiner circuitry 314. In other examples, the drive interface circuitry 318 can cause the drive 115 to operate by any other suitable means. The operations 800 end.

Figure 9:
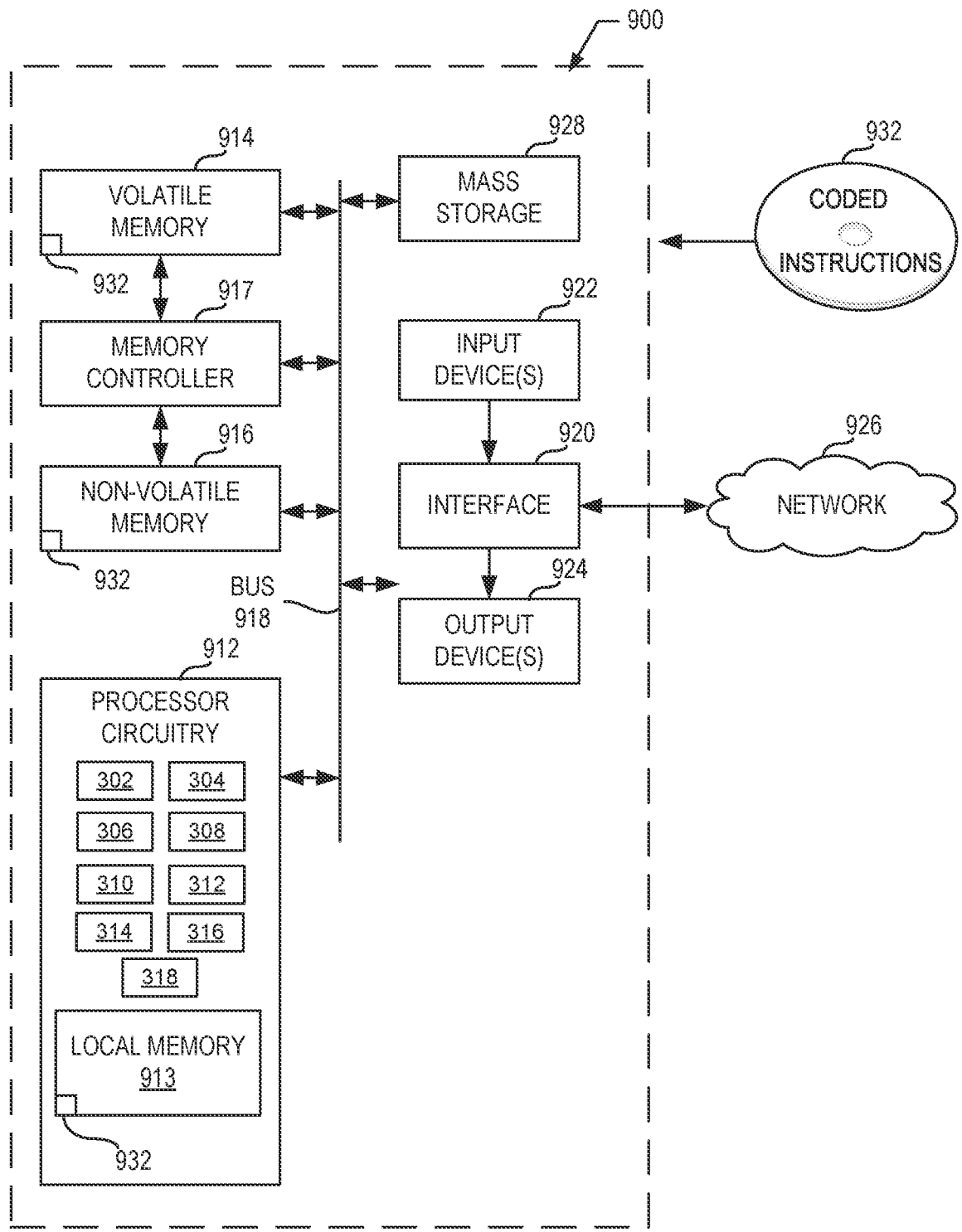
FIG. 9 is a block diagram of an example processing platform including processor circuitry structured to execute the example machine readable instructions and/or the example operations of FIGS. 7 and 8 to implement the trailer controller of FIGS. 1 and/or 3.

FIG. 9 is a block diagram of an example processor platform 900 structured to execute and/or instantiate the machine readable instructions and/or the operations of FIGS. 7 and 8 to implement the trailer controller 106 of FIGS. 1 and 3. The processor platform 900 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a headset (e.g., an augmented reality (AR) headset, a virtual reality (VR) headset, etc.) or other wearable device, or any other type of computing device.

The processor platform 900 of the illustrated example includes processor circuitry 912. The processor circuitry 912 of the illustrated example is hardware. For example, the processor circuitry 912 can be implemented by one or more integrated circuits, logic circuits, FPGAs, microprocessors, CPUs, GPUs, DSPs, and/or microcontrollers from any desired family or manufacturer. The processor circuitry 912 may be implemented by one or more semiconductor based (e.g., silicon based) devices. In this example, the processor circuitry 912 implements the example sensor interface circuitry 302, the example event detector circuitry 304, the example weight distribution determiner circuitry 306, the example stability estimator circuitry 308, example threshold comparator circuitry 310, the example alert generator circuitry 312, the example battery location determiner circuitry 314, the example load status circuitry 316, and the example drive interface circuitry 318.

The processor circuitry 912 of the illustrated example includes a local memory 913 (e.g., a cache, registers, etc.). The processor circuitry 912 of the illustrated example is in communication with a main memory including a volatile memory 914 and a non-volatile memory 916 by a bus 918. The volatile memory 914 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 916 may be implemented by flash memory and/or any other desired type of memory device. Access to the main memory 914, 916 of the illustrated example is controlled by a memory controller 917.

The processor platform 900 of the illustrated example also includes interface circuitry 920. The interface circuitry 920 may be implemented by hardware in accordance with any type of interface standard, such as an Ethernet interface, a universal serial bus (USB) interface, a Bluetooth® interface, a near field communication (NFC) interface, a Peripheral Component Interconnect (PCI) interface, and/or a Peripheral Component Interconnect Express (PCIe) interface.

In the illustrated example, one or more input devices 922 are connected to the interface circuitry 920. The input device(s) 922 permit(s) a user to enter data and/or commands into the processor circuitry 912. The input device(s) 922 can be implemented by, for example, an audio sensor, a microphone, a camera (still or video), a keyboard, a button, a mouse, a touchscreen, a track-pad, a trackball, an isopoint device, and/or a voice recognition system.

One or more output devices 924 are also connected to the interface circuitry 920 of the illustrated example. The output device(s) 924 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 920 of the illustrated example, thus, typically includes a graphics driver card, a graphics driver chip, and/or graphics processor circuitry such as a GPU.

The interface circuitry 920 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 926. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 900 of the illustrated example also includes one or more mass storage devices 928 to store software and/or data. Examples of such mass storage devices 928 include magnetic storage devices, optical storage devices, floppy disk drives, HDDs, CDs, Blu-ray disk drives, redundant array of independent disks (RAID) systems, solid state storage devices such as flash memory devices and/or SSDs, and DVD drives.

The machine executable instructions 932, which may be implemented by the machine readable instructions of FIGS. 7 and 8, may be stored in the mass storage device 928, in the volatile memory 914, in the non-volatile memory 916, and/or on a removable non-transitory computer readable storage medium such as a CD or DVD.

Figure 10:
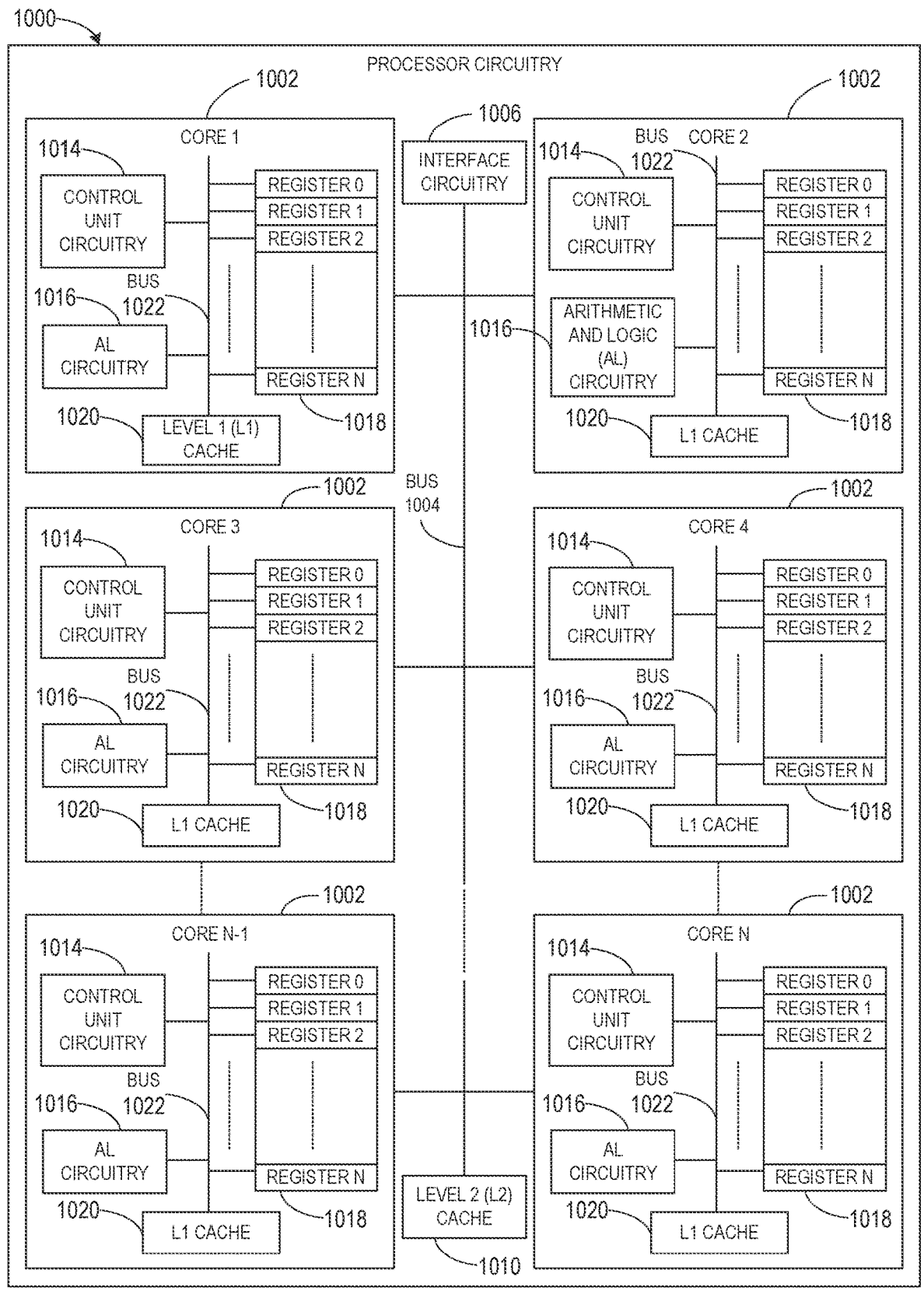
FIG. 10 is a block diagram of an example implementation of the processor circuitry of FIG. 9.

FIG. 10 is a block diagram of an example implementation of the processor circuitry 912 of FIG. 9. In this example, the processor circuitry 912 of FIG. 9 is implemented by a general purpose microprocessor 1000. The general purpose microprocessor circuitry 1000 executes some or all of the machine readable instructions of the flowcharts of FIGS. 7 and 8 to effectively instantiate the trailer controller 106 of FIGS. 1 and 3 as logic circuits to perform the operations corresponding to those machine readable instructions. In some such examples, the circuitry of FIG. 3 is instantiated by the hardware circuits of the microprocessor 1000 in combination with the instructions. For example, the microprocessor 1000 may implement multi-core hardware circuitry such as a CPU, a DSP, a GPU, an XPU, etc. Although it may include any number of example cores 1002 (e.g., 1 core), the microprocessor 1000 of this example is a multi-core semiconductor device including N cores. The cores 1002 of the microprocessor 1000 may operate independently or may cooperate to execute machine readable instructions. For example, machine code corresponding to a firmware program, an embedded software program, or a software program may be executed by one of the cores 1002 or may be executed by multiple ones of the cores 1002 at the same or different times. In some examples, the machine code corresponding to the firmware program, the embedded software program, or the software program is split into threads and executed in parallel by two or more of the cores 1002. The software program may correspond to a portion or all of the machine readable instructions and/or operations represented by the flowcharts of FIGS. 7 and 8.

The cores 1002 may communicate by a first example bus 1004. In some examples, the first bus 1004 may implement a communication bus to effectuate communication associated with one(s) of the cores 1002. For example, the first bus 1004 may implement at least one of an Inter-Integrated Circuit (I2C) bus, a Serial Peripheral Interface (SPI) bus, a PCI bus, or a PCIe bus. Additionally or alternatively, the first bus 1004 may implement any other type of computing or electrical bus. The cores 1002 may obtain data, instructions, and/or signals from one or more external devices by example interface circuitry 1006. The cores 1002 may output data, instructions, and/or signals to the one or more external devices by the interface circuitry 1006. Although the cores 1002 of this example include example local memory 1020 (e.g., Level 1 (L1) cache that may be split into an L1 data cache and an L1 instruction cache), the microprocessor 1000 also includes example shared memory 1010 that may be shared by the cores (e.g., Level 2 (L2_ cache)) for high-speed access to data and/or instructions. Data and/or instructions may be transferred (e.g., shared) by writing to and/or reading from the shared memory 1010. The local memory 1020 of each of the cores 1002 and the shared memory 1010 may be part of a hierarchy of storage devices including multiple levels of cache memory and the main memory (e.g., the main memory 914, 916 of FIG. 9). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 1002 may be referred to as a CPU, DSP, GPU, etc., or any other type of hardware circuitry. Each core 1002 includes control unit circuitry 1014, arithmetic and logic (AL) circuitry (sometimes referred to as an ALU) 1016, a plurality of registers 1018, the L1 cache 1020, and a second example bus 1022. Other structures may be present. For example, each core 1002 may include vector unit circuitry, single instruction multiple data (SIMD) unit circuitry, load/store unit (LSU) circuitry, branch/jump unit circuitry, floating-point unit (FPU) circuitry, etc. The control unit circuitry 1014 includes semiconductor-based circuits structured to control (e.g., coordinate) data movement within the corresponding core 1002. The AL circuitry 1016 includes semiconductor-based circuits structured to perform one or more mathematic and/or logic operations on the data within the corresponding core 1002. The AL circuitry 1016 of some examples performs integer based operations. In other examples, the AL circuitry 1016 also performs floating point operations. In yet other examples, the AL circuitry 1016 may include first AL circuitry that performs integer based operations and second AL circuitry that performs floating point operations. In some examples, the AL circuitry 1016 may be referred to as an Arithmetic Logic Unit (ALU). The registers 1018 are semiconductor-based structures to store data and/or instructions such as results of one or more of the operations performed by the AL circuitry 1016 of the corresponding core 1002. For example, the registers 1018 may include vector register(s), SIMD register(s), general purpose register(s), flag register(s), segment register(s), machine specific register(s), instruction pointer register(s), control register(s), debug register(s), memory management register(s), machine check register(s), etc. The registers 1018 may be arranged in a bank as shown in FIG. 10. Alternatively, the registers 1018 may be organized in any other arrangement, format, or structure including distributed throughout the core 1002 to shorten access time. The second bus 1022 may implement at least one of an I2C bus, a SPI bus, a PCI bus, or a PCIe bus Each core 1002 and/or, more generally, the microprocessor 1000 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 1000 is a semiconductor device fabricated to include many transistors interconnected to implement the structures described above in one or more integrated circuits (ICs) contained in one or more packages. The processor circuitry may include and/or cooperate with one or more accelerators. In some examples, accelerators are implemented by logic circuitry to perform certain tasks more quickly and/or efficiently than can be done by a general purpose processor. Examples of accelerators include ASICs and FPGAs such as those discussed herein. A GPU or other programmable device can also be an accelerator. Accelerators may be on-board the processor circuitry, in the same chip package as the processor circuitry and/or in one or more separate packages from the processor circuitry.

Figure 11:
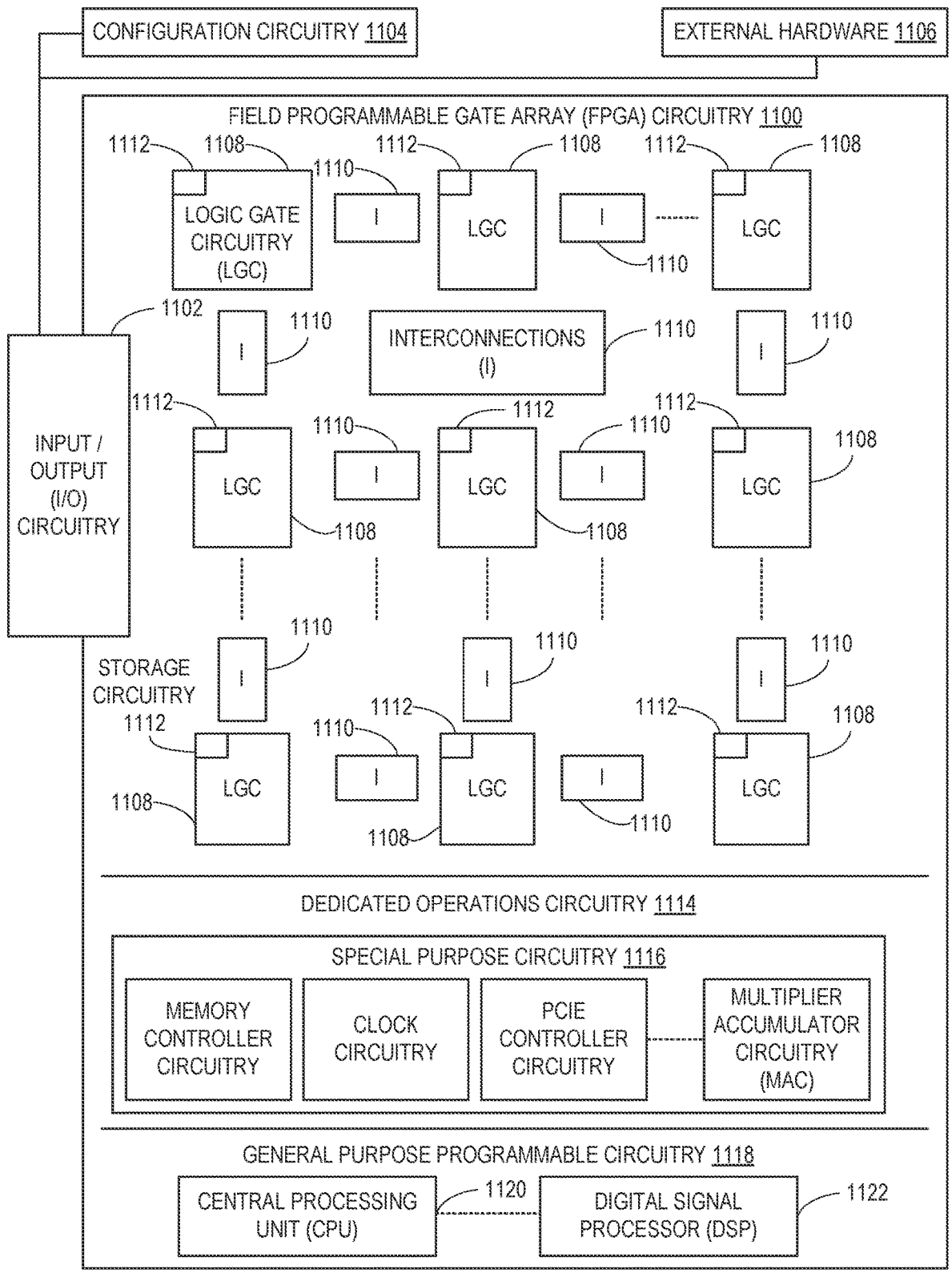
FIG. 11 is a block diagram of another example implementation of the processor circuitry of FIG. 9.

FIG. 11 is a block diagram of another example implementation of the processor circuitry 912 of FIG. 9. In this example, the processor circuitry 912 is implemented by FPGA circuitry 1100. The FPGA circuitry 1100 can be used, for example, to perform operations that could otherwise be performed by the example microprocessor 1000 of FIG. 10 executing corresponding machine readable instructions. However, once configured, the FPGA circuitry 1100 instantiates the machine readable instructions in hardware and, thus, can often execute the operations faster than they could be performed by a general purpose microprocessor executing the corresponding software.

More specifically, in contrast to the microprocessor 1000 of FIG. 10 described above (which is a general purpose device that may be programmed to execute some or all of the machine readable instructions represented by the flowcharts of FIGS. 7 and 8 but whose interconnections and logic circuitry are fixed once fabricated), the FPGA circuitry 1100 of the example of FIG. 11 includes interconnections and logic circuitry that may be configured and/or interconnected in different ways after fabrication to instantiate, for example, some or all of the machine readable instructions represented by the flowcharts of FIGS. 7 and 8. In particular, the FPGA 1100 may be thought of as an array of logic gates, interconnections, and switches. The switches can be programmed to change how the logic gates are interconnected by the interconnections, effectively forming one or more dedicated logic circuits (unless and until the FPGA circuitry 1100 is reprogrammed). The configured logic circuits enable the logic gates to cooperate in different ways to perform different operations on data received by input circuitry. Those operations may correspond to some or all of the software represented by the flowcharts of FIGS. 7 and 8. As such, the FPGA circuitry 1100 may be structured to effectively instantiate some or all of the machine readable instructions of the flowcharts of FIGS. 7 and 8 as dedicated logic circuits to perform the operations corresponding to those software instructions in a dedicated manner analogous to an ASIC. Therefore, the FPGA circuitry 1100 may perform the operations corresponding to the some or all of the machine readable instructions of FIGS. 7 and 8 faster than the general purpose microprocessor can execute the same.

In the example of FIG. 11, the FPGA circuitry 1100 is structured to be programmed (and/or reprogrammed one or more times) by an end user by a hardware description language (HDL) such as Verilog. The FPGA circuitry 1100 of FIG. 11, includes example input/output (I/O) circuitry 1102 to obtain and/or output data to/from example configuration circuitry 1104 and/or external hardware (e.g., external hardware circuitry) 1106. For example, the configuration circuitry 1104 may implement interface circuitry that may obtain machine readable instructions to configure the FPGA circuitry 1100, or portion(s) thereof. In some such examples, the configuration circuitry 1104 may obtain the machine readable instructions from a user, a machine (e.g., hardware circuitry (e.g., programmed or dedicated circuitry) that may implement an Artificial Intelligence/Machine Learning (AI/ML) model to generate the instructions), etc. In some examples, the external hardware 1106 may implement the microprocessor 1000 of FIG. 10. The FPGA circuitry 1100 also includes an array of example logic gate circuitry 1108, a plurality of example configurable interconnections 1110, and example storage circuitry 1112. The logic gate circuitry 1108 and interconnections 1110 are configurable to instantiate one or more operations that may correspond to at least some of the machine readable instructions of FIGS. 7 and 8 and/or other desired operations. The logic gate circuitry 1108 shown in FIG. 11 is fabricated in groups or blocks. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 1108 to enable configuration of the electrical structures and/or the logic gates to form circuits to perform desired operations. The logic gate circuitry 1108 may include other electrical structures such as look-up tables (LUTs), registers (e.g., flip-flops or latches), multiplexers, etc.

The interconnections 1110 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 1108 to program desired logic circuits.

The storage circuitry 1112 of the illustrated example is structured to store result(s) of the one or more of the operations performed by corresponding logic gates. The storage circuitry 1112 may be implemented by registers or the like. In the illustrated example, the storage circuitry 1112 is distributed amongst the logic gate circuitry 1108 to facilitate access and increase execution speed.

The example FPGA circuitry 1100 of FIG. 11 also includes example Dedicated Operations Circuitry 1114. In this example, the Dedicated Operations Circuitry 1114 includes special purpose circuitry 1116 that may be invoked to implement commonly used functions to avoid the need to program those functions in the field. Examples of such special purpose circuitry 1116 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 1100 may also include example general purpose programmable circuitry 1118 such as an example CPU 1120 and/or an example DSP 1122. Other general purpose programmable circuitry 1118 may additionally or alternatively be present such as a GPU, an XPU, etc., that can be programmed to perform other operations.

Although FIGS. 10 and 11 illustrate two example implementations of the processor circuitry 912 of FIG. 9, many other approaches are contemplated. For example, as mentioned above, modern FPGA circuitry may include an on-board CPU, such as one or more of the example CPU 1120 of FIG. 11. Therefore, the processor circuitry 912 of FIG. 9 may additionally be implemented by combining the example microprocessor 1000 of FIG. 10 and the example FPGA circuitry 1100 of FIG. 11. In some such hybrid examples, a first portion of the machine readable instructions represented by the flowcharts of FIGS. 7 and 8 may be executed by one or more of the cores 1002 of FIG. 10, a second portion of the machine readable instructions represented by the flowcharts of FIGS. 7 and 8 may be executed by the FPGA circuitry 1100 of FIG. 11, and/or a third portion of the machine readable instructions represented by the flowcharts of FIGS. 7 and 8 may be executed by an ASIC. It should be understood that some or all of the circuitry of FIG. 3 may, thus, be instantiated at the same or different times. Some or all of the circuitry may be instantiated, for example, in one or more threads executing concurrently and/or in series. Moreover, in some examples, some or all of the circuitry of FIG. 3 may be implemented within one or more virtual machines and/or containers executing on the microprocessor.

In some examples, the processor circuitry 912 of FIG. 9 may be in one or more packages. For example, the processor circuitry 1000 of FIG. 10 and/or the FPGA circuitry 1100 of FIG. 11 may be in one or more packages. In some examples, an XPU may be implemented by the processor circuitry 912 of FIG. 9, which may be in one or more packages. For example, the XPU may include a CPU in one package, a DSP in another package, a GPU in yet another package, and an FPGA in still yet another package.

Example methods, apparatus, systems, and articles of manufacture for trailers with adjustable batteries are disclosed herein. Further examples and combinations thereof include the following:

Example 1 includes a trailer to be coupled to a first vehicle comprising a platform, a battery disposed at a first location relative to the platform, a drive to move the battery relative to the platform, and a controller to determine a first load distribution on the platform, and in response to determining the first load distribution on the platform does not satisfy a first threshold, adjust a position of the battery, via the drive, to a second location relative to the platform.

Example 2 includes the trailer of example 1, further including one or more wheels, and wherein the controller determines the first load distribution on the platform by determining a first portion of a load of the trailer transferred to a first vehicle via a tongue coupled to the first vehicle, and determining a second portion of the load of the trailer carried via the one or more wheels.

Example 3 includes the trailer of example 2, wherein the first threshold is based on the first portion being between 10% and 15% of the load.

Example 4 includes the trailer of example 1, wherein the controller is further to in response to moving the battery to the second location, determine a second load distribution, determine if the second load distribution satisfies the first threshold, and in response to determining the second load distribution does not satisfy the first threshold, generating an alert to a user of the first vehicle, the alert including an indication to move an object disposed on the platform.

Example 5 includes the trailer of example 1, wherein the controller is further to detect, via a first sensor, during operation of the first vehicle, a first event, and move, via the drive, the battery to a third position in response to detecting the first event.

Example 6 includes the trailer of example 5, wherein the first event includes a second vehicle passing the first vehicle.

Example 7 includes the trailer of example 5, wherein the first event satisfies a second threshold associated with decreasing stability of the platform.

Example 8 includes a non-transitory computer readable medium comprising instructions, which when executed, cause a processor to determine a first load distribution on a platform of a trailer coupled to a first vehicle, and in response to determining the first load distribution does not satisfy a first threshold, move, via a drive, a battery coupled to the platform from a first location to a second location.

Example 9 includes the non-transitory computer readable medium of example 8, wherein the instructions, when executed, cause the processor to determine a first portion of a load of the trailer transferred to the first vehicle via a tongue coupled to the first vehicle, and determine a second portion of the load of the trailer carried via one or more wheels of the first vehicle.

Example 10 includes the non-transitory computer readable medium of example 9, wherein the first threshold is based on the first portion being between 10% and 15% of the load.

Example 11 includes the non-transitory computer readable medium of example 8, wherein the instructions, when executed, cause the processor to in response to moving the battery to the second location, determine a second load distribution, determine if the second load distribution satisfies the first threshold, and in response to determining the second load distribution does not satisfy the first threshold, generating an alert to a user of the first vehicle, the alert including an indication to move an object disposed on the platform.

Example 12 includes the non-transitory computer readable medium of example 8, wherein the instructions, when executed, cause the processor to detect, via a first sensor, during operation of the first vehicle, a first event, and move, via the drive, the battery to a third position in response to detecting the first event.

Example 13 includes the non-transitory computer readable medium of example 12, wherein the first event includes a second vehicle passing the first vehicle.

Example 14 includes the non-transitory computer readable medium of example 12, wherein the first event satisfies a second threshold associated with decrease stability of the platform.

Example 15 includes a method including determining a first load distribution on a platform of a trailer coupled to a first vehicle, and in response to determining the first load distribution does not satisfy a first threshold, moving, via a drive, a battery coupled to the platform from a first location to a second location.

Example 16 includes the method of example 15, further including determining a first portion of a load of the trailer transferred to the first vehicle via a tongue coupled to the first vehicle, and determining a second portion of the load of the trailer carried via one or more wheels of the first vehicle.

Example 17 includes the method of example 15, further including in response to moving the battery to the second location, determining a second load distribution, determining if the second load distribution satisfies the first threshold, and in response to determining the second load distribution does not satisfy the first threshold, generating an alert to a user of the first vehicle, the alert including an indication to move an object disposed on the platform.

Example 18 includes the method of example 15, further including detecting, via a first sensor, during operation of the first vehicle, a first event, and moving, via the drive, the battery to a third position.

Example 19 includes the method of example 18, wherein the first event includes a second vehicle passing the first vehicle.

Example 20 includes the method of example 18, wherein the first event satisfies a second threshold associated with decreasing stability of the platform.

The following claims are hereby incorporated into this Detailed Description by this reference. Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

What is claimed is:

1. A trailer to be coupled to a first vehicle comprising:
   a platform;
   one or more wheels;
   a battery disposed at a first location relative to the platform;
   a drive to move the battery relative to the platform; and
   a controller to:
   determine a first load distribution on the platform by:
   determining a first portion of a load of the trailer transferred to the first vehicle via a tongue coupled to the first vehicle; and
   determining a second portion of the load of the trailer carried via the one or more wheels; and
   in response to determining the first load distribution on the platform does not satisfy a first threshold, adjust a position of the battery, via the drive, to a second location relative to the platform.

2. The trailer of claim 1, wherein the first threshold is based on the first portion being between 10% and 15% of the load.

3. The trailer of claim 1, wherein the controller is further to:
   in response to moving the battery to the second location, determine a second load distribution;
   determine if the second load distribution satisfies the first threshold; and
   in response to determining the second load distribution does not satisfy the first threshold, generating an alert to a user of the first vehicle, the alert including an indication to move an object disposed on the platform.

4. The trailer of claim 3, wherein the controller is to generate the alert by displaying the indication via a lamp of the first vehicle.

5. The trailer of claim 1, wherein the controller is further to:
   detect, via a first sensor, during operation of the first vehicle, a first event; and
   move, via the drive, the battery to a third position in response to detecting the first event.

6. The trailer of claim 5, wherein the first event includes a second vehicle passing the first vehicle.

7. The trailer of claim 5, wherein the first event satisfies a second threshold associated with decreasing stability of the platform.

8. A non-transitory computer readable medium comprising instructions, which when executed, cause a processor to:
   determine a first load distribution on a platform of a trailer coupled to a first vehicle, the determination of the first load distribution including:
   determine a first portion of a load of the trailer transferred to the first vehicle via a tongue coupled to the first vehicle; and
   determine a second portion of the load of the trailer carried via one or more wheels of the first vehicle; and
   in response to determining the first load distribution does not satisfy a first threshold, move, via a drive, a battery coupled to the platform from a first location to a second location.

9. The non-transitory computer readable medium of claim 8, wherein the first threshold is based on the first portion being between 10% and 15% of the load.

10. The non-transitory computer readable medium of claim 8, wherein the instructions, when executed, cause the processor to:
    in response to moving the battery to the second location, determine a second load distribution;
    determine if the second load distribution satisfies the first threshold; and in response to determining the second load distribution does not satisfy the first threshold, generating an alert to a user of the first vehicle, the alert including an indication to move an object disposed on the platform.

11. The non-transitory computer readable medium of claim 10, wherein the instructions, when executed, cause the processor to generate the alert by displaying the indication via a lamp of the first vehicle.

12. The non-transitory computer readable medium of claim 8, wherein the instructions, when executed, cause the processor to:
  detect, via a first sensor, during operation of the first vehicle, a first event; and
  move, via the drive, the battery to a third position in response to detecting the first event.

13. The non-transitory computer readable medium of claim 12, wherein the first event includes a second vehicle passing the first vehicle.

14. The non-transitory computer readable medium of claim 12, wherein the first event satisfies a second threshold associated with decrease stability of the platform.

15. A method including:
  determining a first load distribution on a platform of a trailer coupled to a first vehicle, the determining the first load distribution including:
    determining a first portion of a load of the trailer transferred to the first vehicle via a tongue coupled to the first vehicle; and
    determining a second portion of the load of the trailer carried via one or more wheels of the first vehicle; and
  in response to determining the first load distribution does not satisfy a first threshold, moving, via a drive, a battery coupled to the platform from a first location to a second location.

16. The method of claim 15, further including:
  in response to moving the battery to the second location, determining a second load distribution;
  determining if the second load distribution satisfies the first threshold; and
  in response to determining the second load distribution does not satisfy the first threshold, generating an alert to a user of the first vehicle, the alert including an indication to move an object disposed on the platform.

17. The method of claim 15, further including:
  detecting, via a first sensor, during operation of the first vehicle, a first event; and
  moving, via the drive, the battery to a third position.

18. The method of claim 17, wherein the first event includes a second vehicle passing the first vehicle.

19. The method of claim 17, wherein the first event satisfies a second threshold associated with decreasing stability of the platform.

20. The method of claim 15, wherein the first threshold is based on the first portion being between 10% and 15% of the load.

* * * * *